US012720581B2

(12) United States Patent
Hosseini et al.

(10) Patent No.: US 12,720,581 B2
(45) Date of Patent: Aug. 25, 2026

(54) UE INSTRUCTED DYNAMIC ANTENNA SHARING

(71) Applicant: QUALCOMM Incorporated, San Diego, CA (US)

(72) Inventors: Kianoush Hosseini, San Diego, CA (US); Jing Jiang, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 437 days.

(21) Appl. No.: 18/338,006

(22) Filed: Jun. 20, 2023

(65) Prior Publication Data

US 2024/0430918 A1 Dec. 26, 2024

(51) Int. Cl.

| | |
|---|---|
| ***H04W 88/02*** | (2009.01) |
| ***H04B 7/06*** | (2006.01) |
| ***H04B 7/08*** | (2006.01) |
| ***H04L 5/00*** | (2006.01) |
| ***H04W 72/1268*** | (2023.01) |
| ***H04W 72/51*** | (2023.01) |
| *H04B 7/0413* | (2017.01) |

(52) U.S. Cl.
CPC .......... *H04W 72/51* (2023.01); *H04B 7/0628* (2013.01); *H04B 7/0802* (2013.01); *H04L 5/0055* (2013.01); *H04W 72/1268* (2013.01); *H04B 7/0413* (2013.01)

(58) Field of Classification Search
CPC .. H04B 7/0413; H04B 7/0628; H04B 7/0802; H04L 5/0055; H04W 72/1268; H04W 72/51
See application file for complete search history.

(56) References Cited

U.S. PATENT DOCUMENTS

2013/0142125 A1* 6/2013 Shimezawa ............ H04B 7/046 370/328
2016/0205540 A1* 7/2016 Wu ....................... H04W 28/06 370/329
2017/0070902 A1* 3/2017 Fukuta .................. H04W 16/14
2023/0086223 A1* 3/2023 Takahashi ......... H04W 72/0453 370/329

FOREIGN PATENT DOCUMENTS

WO WO-2022081060 A1 * 4/2022 ............ H04W 76/16

* cited by examiner

*Primary Examiner* — Phuc H Tran
(74) *Attorney, Agent, or Firm* — Procopio, Cory, Hargreaves & Savitch LLP

(57) ABSTRACT

A method for wireless communication at a user equipment (UE) and related apparatus are provided. In the method, a UE configures a first distribution of a set of radio capabilities over a plurality of operational scenarios, and transmits, to a network entity, a signal including at least one portion of the first distribution to indicate to the network entity to configure a scheduling configuration based on the at least one portion of the first distribution. The UE further communicates, based on the first distribution of the set of radio capabilities and the scheduling configuration, with the network. The method enables the UE to actively participate in resource allocation decisions, resulting in enhanced communication performance and optimized resource utilization.

30 Claims, 11 Drawing Sheets

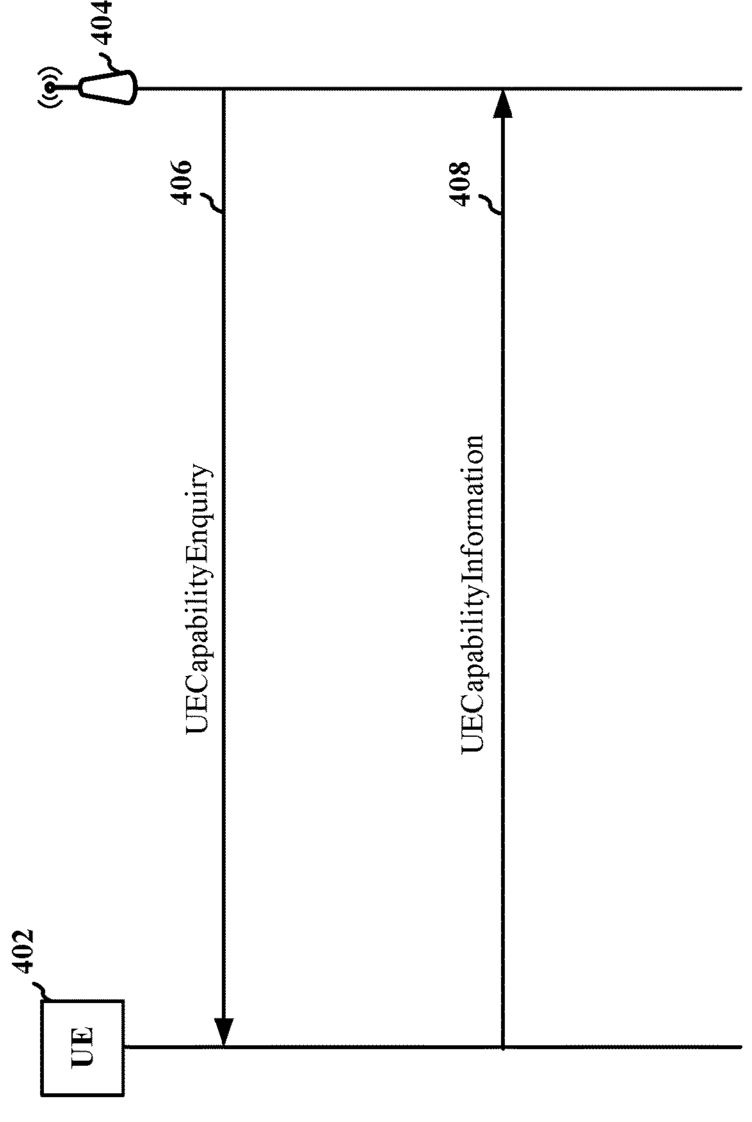
FIG. 4

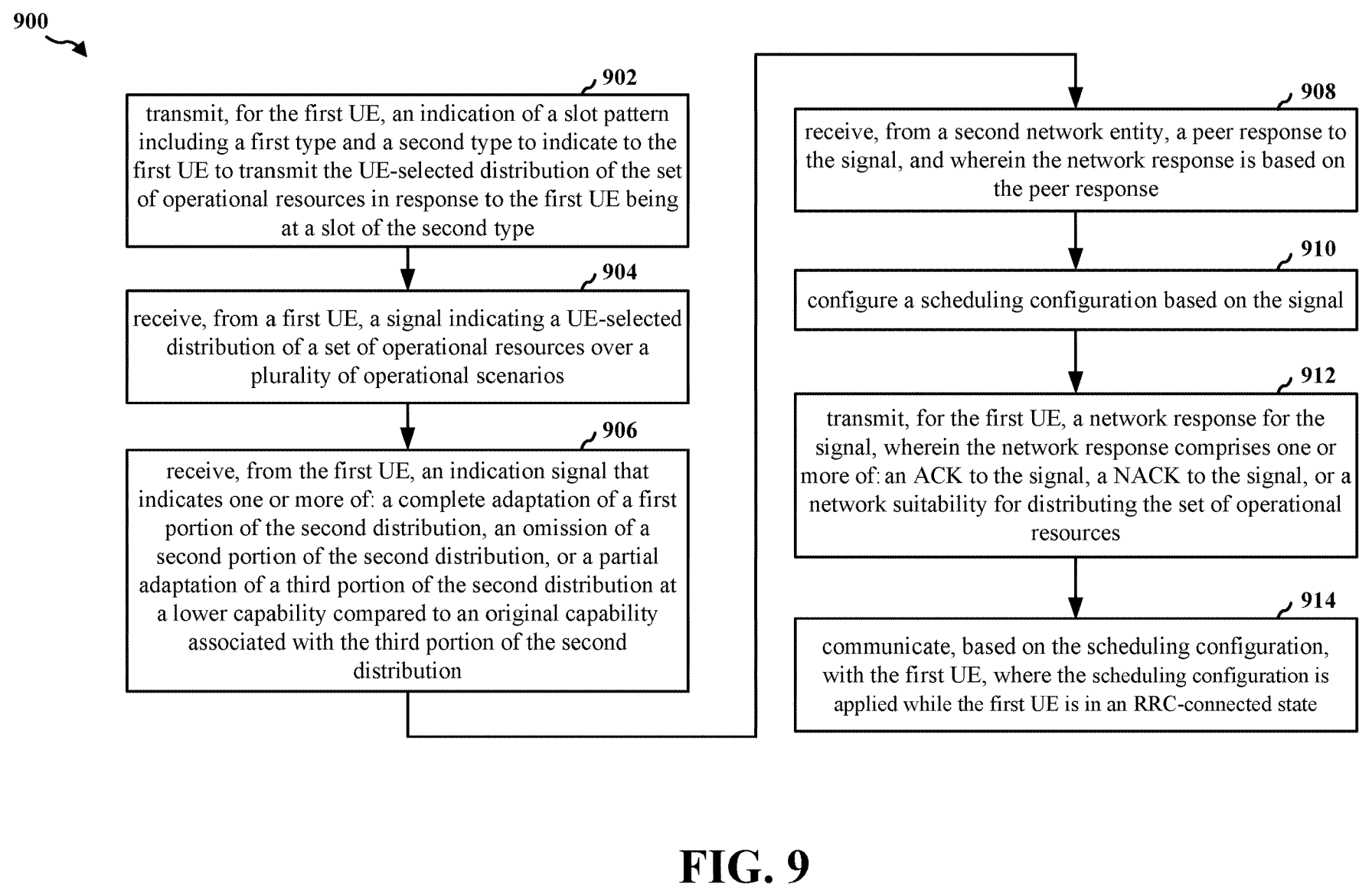

900

902 transmit, for the first UE, an indication of a slot pattern including a first type and a second type to indicate to the first UE to transmit the UE-selected distribution of the set of operational resources in response to the first UE being at a slot of the second type 904 receive, from a first UE, a signal indicating a UE-selected distribution of a set of operational resources over a plurality of operational scenarios 906 receive, from the first UE, an indication signal that indicates one or more of: a complete adaptation of a first portion of the second distribution, an omission of a second portion of the second distribution, or a partial adaptation of a third portion of the second distribution at a lower capability compared to an original capability associated with the third portion of the second distribution 908 receive, from a second network entity, a peer response to the signal, and wherein the network response is based on the peer response 910 configure a scheduling configuration based on the signal 912 transmit, for the first UE, a network response for the signal, wherein the network response comprises one or more of: an ACK to the signal, a NACK to the signal, or a network suitability for distributing the set of operational resources 914 communicate, based on the scheduling configuration, with the first UE, where the scheduling configuration is applied while the first UE is in an RRC-connected state

FIG. 9

UE INSTRUCTED DYNAMIC ANTENNA SHARING

TECHNICAL FIELD

The present disclosure relates generally to communication systems, and more particularly, to user equipment (UE)-instructed dynamic antenna sharing in wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include at least one memory and at least one processor coupled to the at least one memory. Based at least in part on information stored in the at least one memory, the at least one processor, individually or in any combination, may be configured to configure a first distribution of a set of radio capabilities over a plurality of operational scenarios; transmitting, to a network entity, a signal including at least one portion of the first distribution to indicate to the network entity to configure a scheduling configuration based on the at least one portion of the first distribution; and communicating, based on the first distribution of the set of radio capabilities and the scheduling configuration, with the network entity.

In an aspect of the disclosure, a method, a computer-readable medium, and an apparatus are provided for wireless communication at a network entity. The apparatus may include at least one memory and at least one processor coupled to the at least one memory. Based at least in part on information stored in the at least one memory, the at least one processor, individually or in any combination, may be configured to receive, from a first UE, a signal indicating a UE-selected distribution of a set of radio capabilities over a plurality of operational scenarios; configuring a scheduling configuration based on the signal; and communicating, based on the scheduling configuration, with the first UE.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4 is a diagram illustrating an example of UE capability report.

FIG. 9 is a flowchart illustrating methods of wireless communication at a network entity in accordance with various aspects of the present disclosure.

DETAILED DESCRIPTION

Figure 1:
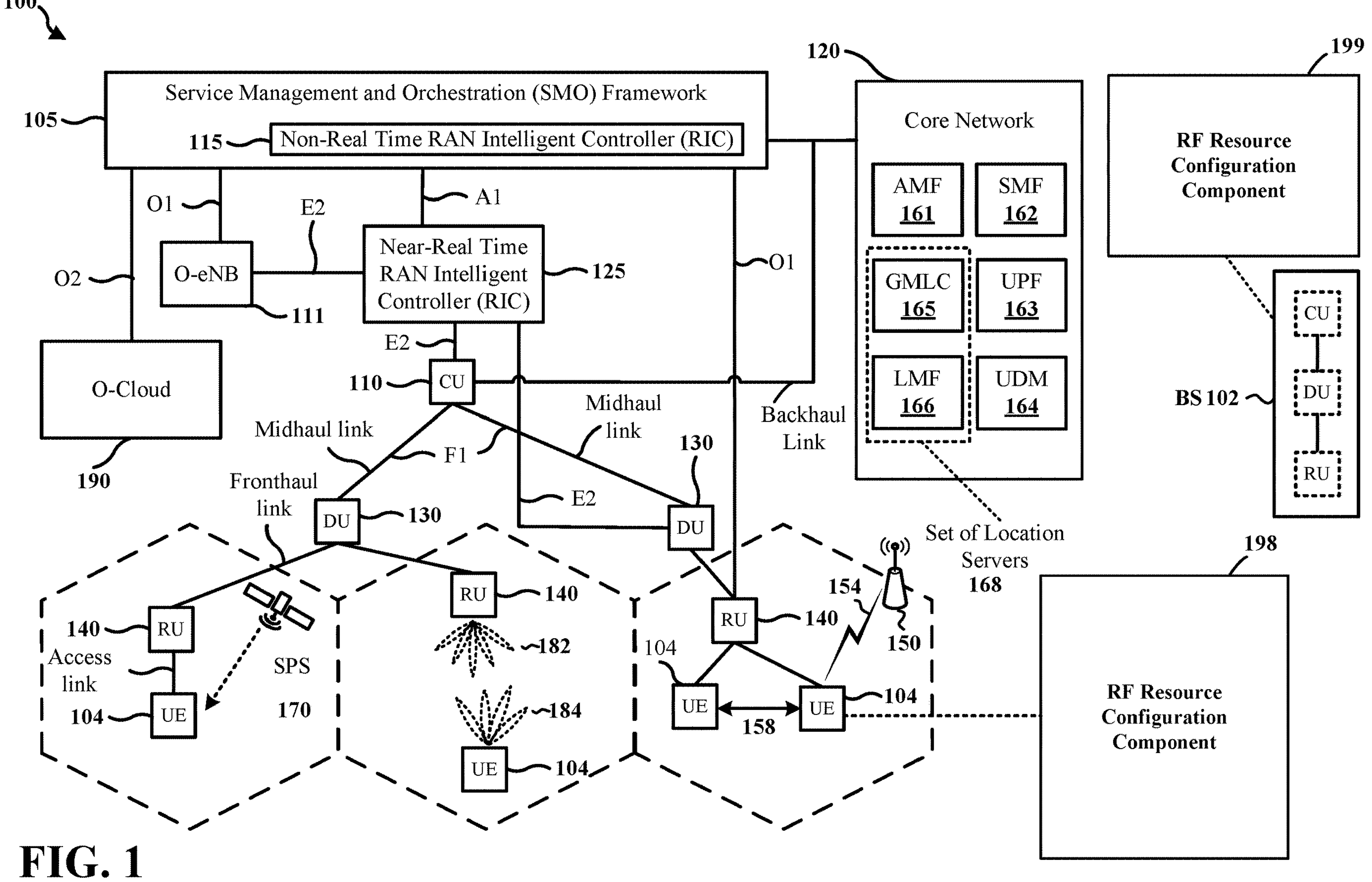
FIG. 1 is a diagram illustrating an example of a wireless communication system and an access network.

Various aspects relate generally to communication systems, and, more particularly, to UE-instructed dynamic antenna sharing in wireless communication. In traditional wireless communication methods, a UE may report a set of capabilities to the network for, for example, resource allocation in specific scenarios, and the UE generally cannot update the reported capabilities. These methods for reporting UE capabilities and allocating resources are suboptimal in certain scenarios, particularly when operating in multiple radio access technology (RAT) (multi-RAT) environments or when UEs experience changes in their capabilities due to varying conditions. The limited ability of the UE to update its reported capabilities also leads to inefficient resource allocation and reduced communication performance.

Example aspects presented herein provide methods and apparatuses that allow the UE to actively guide the network in making informed decisions about resource allocation and communication configuration. In some examples, a UE may configure a first distribution of a set of radio capabilities over a plurality of operational scenarios; and transmit, to a network entity, a signal including at least one portion of the first distribution to indicate to the network entity to configure a scheduling configuration based on the at least one portion of the first distribution. The UE may further communicate with the network entity based on the first distribution of the set of radio capabilities and the scheduling configuration.

Particular aspects of the subject matter described in this disclosure can be implemented to realize one or more of the following potential advantages. In some examples, by enabling a UE to actively participate in resource allocation decisions, the described techniques can be used to enhance communication performance and optimize resource utilization in wireless communication. Additionally, the UE and network may work together to coordinate decision-making regarding the distribution of antenna resources, resulting in more informed and balanced decisions about resource allocation.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer-executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a “sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an RF resource configuration component 198. The RF resource configuration component 198 may be configured to configure a first distribution of a set of radio capabilities over a plurality of operational scenarios; transmit, to a network entity, a signal including at least one portion of the first distribution to indicate to the network entity to configure a scheduling configuration based on the at least one portion of the first distribution; and communicate, based on the first distribution of the set of radio capabilities and the scheduling configuration, with the network. In certain aspects, the base station 102 may include an RF resource configuration component 199. The RF resource component 199 may be configured to receive, from a first UE, a signal indicating a UE-selected distribution of a set of radio capabilities over a plurality of operational scenarios; configure a scheduling configuration based on the signal; and communicate, based on the scheduling configuration, with the first UE. Although the following description may be focused on 5G NR, the concepts described herein may be applicable to other similar areas, such as LTE, LTE-A, CDMA, GSM, and other wireless technologies.

Figures 2A, 2B, 2C, 2D:
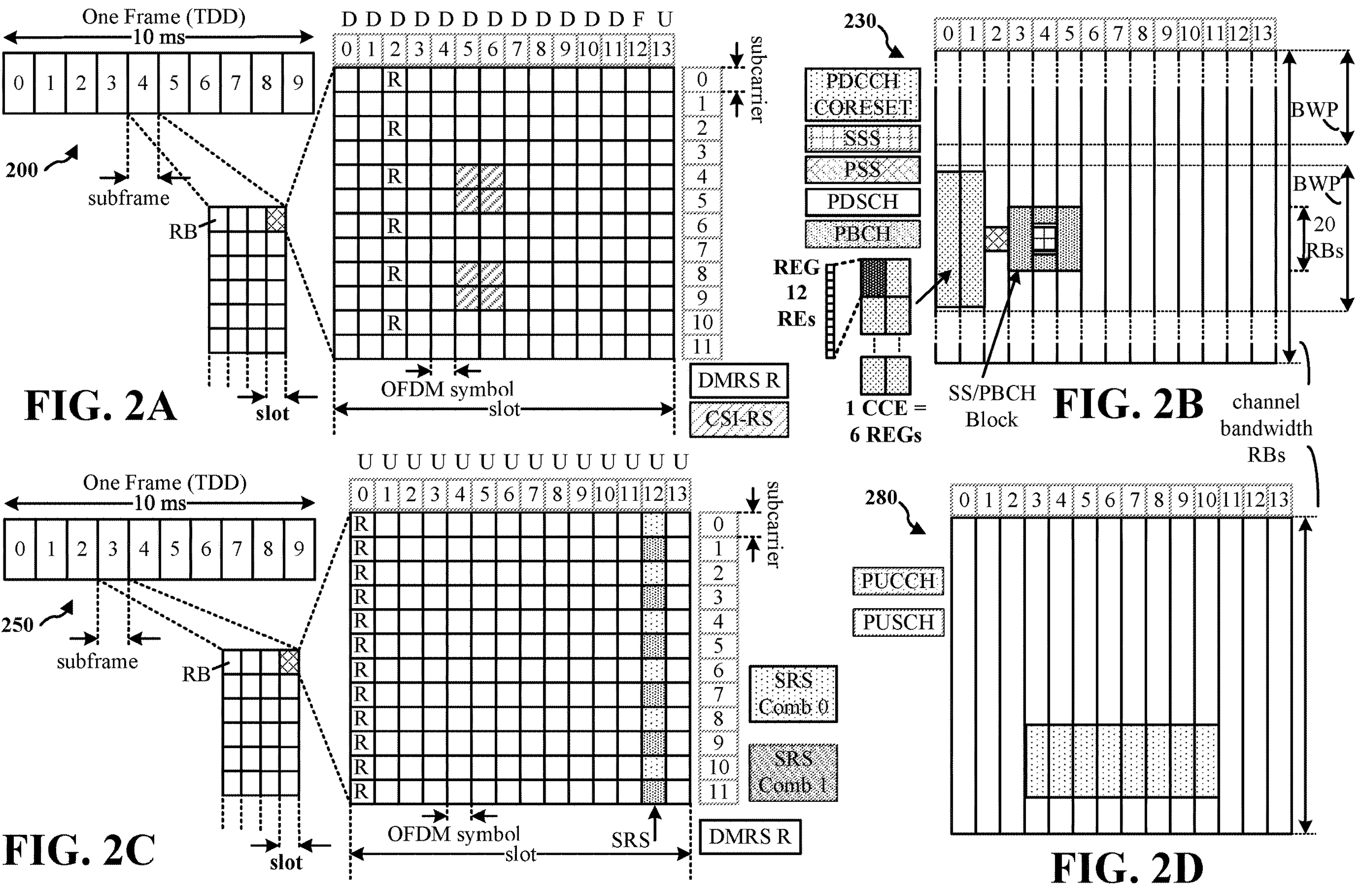
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^{\mu}$ slots/subframe. The subcarrier spacing may be equal to $2^{\mu}*15$ kHz, where u is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
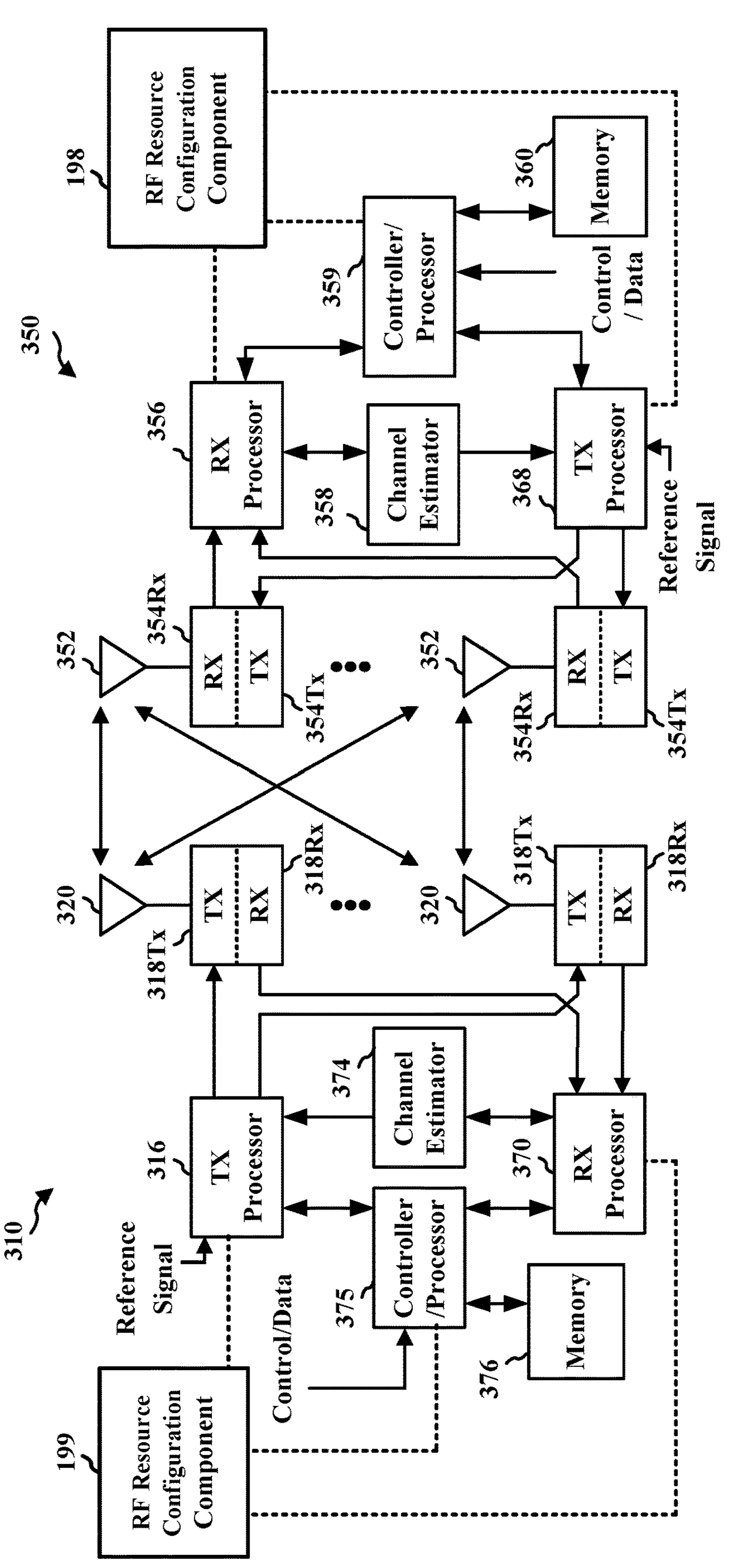
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the RF resource configuration component 198 of FIG. 1.

At least one of the TX processor 316, the RX processor 370, and the controller/processor 375 may be configured to perform aspects in connection with the RF resource configuration component 199 of FIG. 1.

Example aspects presented herein provide UE and network signaling framework to allow more authority in distributing its antenna resources (RF chains, also equivalent to the maximum number of MIMO layers).

In wireless communication, each UE may have a set of capabilities reported to the network for operation in specific scenarios. The UE may be configured to operate in specific scenarios based on a set of capabilities that are reported to the network. These capabilities may include, for example, supported frequency bands, radio access technologies (RATs), transmission modes, and other performance characteristics that are relevant to communication with the network.

FIG. 4 is a diagram 400 illustrating an example of UE capability report. In FIG. 4, the network (e.g., a base station 404) may, at 406, transmit to the UE 402 a capability inquiry (e.g., the UECapabilityEnquiry message). Upon the reception of the inquiry (e.g., the UECapabilityEnquiry message) from the network, the UE 402 may compile and transfer, at 408, its capability information, in the form of, for example, a UECapabilityInformation message, to the network. This information enables the network to understand the capabilities of the UE and optimally allocate resources.

In some examples, the UE may report a set of parameters that characterize its capabilities. The parameters may include, for example, parameters supportedBandCombinationList, featureSetCombinations, and featureSets. The supportedBandCombinationList parameter defines the supported NR and/or MR-DC band combinations by the UE. For each band combination, the UE may identify the associated feature set combination by featuresSetCombinations index referring to featureSetCombination. A fallback band combination resulting from the reported CA and MR-DC band combination may not be signaled but the UE may support it. For intra-band noncontiguous CA band combinations, the UE may include one band combination, and exclude the others for which the presence of uplink CA bandwidth class in the band combination entry is different. One band combination entry can also indicate support of any other possible permutations in the presence of uplink CA bandwidth class where a paired downlink CA bandwidth class is the same or where the number of UL CCs is smaller than the one of paired DL CCs expressed by the CA bandwidth class. For these band combinations not included in the capability, the supported features set is the same as the ones for the band combination included in the UE capability.

In general, the parameter BandCombinationList may indicate whether the UE supports CA/DC or not. For each BandCombination in the BandCombinationList, the UE may report BandParameters, which include DL and UL bandwidth classes.

Additionally, a bandwidth class may be defined by the aggregated transmission bandwidth configuration and the maximum number of CCs supported by a UE.

For a given BandCombination, the UE may report a featureSetCombination on a per bandwidth class (BC) basis. The featureSetCombination may indicate the feature set that the UE supports on the NR and/or MR-DC band combination by FeatureSetCombinatioId.

The featureSetCombination may be represented as a two-dimensional matrix of FeatureSet entries. For example, consider a featureSetCombination consisting of bands B1 and B2, denoted as {B1, B2}, the FeatureSet is reported per band for the featureSetCombination (i.e., per band in the BC). This means that, within the B1-B2 combination, FeatureSet FS1 is reported for band B1, while FeatureSet FS2 is reported for band B2.

Besides the FeatureSet per band for downlink and uplink, the UE may also report certain parameters as FeatureSetDownlinkPerCC and FeatureSetUplinkPerCC. FeatureSetDownlinkPerCC may correspond to an information element (IE) that indicates a set of features that the UE supports on the corresponding carrier of one band entry of a band combination, and FeatureSetUplinkPerCC may correspond to an IE that indicates a set of features that the UE supports on the corresponding carrier of one band entry of a band combination.

In some examples, the capabilities reported on a per FeatureSetPerCC (FSPC) basis may include the maximum number of Multiple-Input Multiple-Output (MIMO) layers and modulation orders.

In conventional systems, when a UE reports its capabilities, it generally cannot update them except in some limited cases. This leads to suboptimal resource allocation and communication performance, as the UE's capabilities may change over time or under different operating conditions. In some scenarios, the UE may use a signaling mechanism to request a reduction in the number of CCs, bandwidth (BW), and MIMO layers for overheating mitigation and power-saving purposes. In some scenarios, a UE may have more accurate information about which link, band, or carrier is suitable for communication when the UE is in a multi-RAT connectivity mode. For example, a UE may have CSI information to or from both sets of carriers active on both cell groups, as well as knowledge of its application specifications and power status. Consequently, the UE is better positioned to decide how to allocate its resources across different RATs, bands, and carriers.

Sending a request to the network to change the configuration may not always be the most efficient approach from the UE's perspective, as the network retains the authority to override the UE's request. Additionally, in cases where schedulers or DUs are uncoordinated (e.g., in the case of dual connectivity (DC)), one scheduler may not have complete information about the UE's state with another scheduler, and hence may not have the full information to make the best decision. Hence, the UE may be in the best position to act as a mediator and guide the network toward making the most informed decisions about resource allocation and communication configuration.

Example aspects presented herein provide a method for enabling a UE to instruct and manage its resource allocation. This approach empowers the UE to make informed decisions about distributing its RF resources (e.g., antennas) across different RATs, bands, and carriers.

For example, consider a scenario where a UE is operating in an NR-DC mode, active on one CC per RAT. The UE may have initially reported two antennas per CC per RAT. However, upon evaluating its current situation, the UE may determine that it is better suited to redistribute its antennas, allocating more antennas to the CC associated with the second RAT, while reducing the antennas for the carrier of the first RAT. In this case, the UE may flexibly change the maximum number of MIMO layers, optimizing its communication performance.

In another example, in a DC or CA configuration, the UE may infer that it is better suited to deactivate one CC and transmit with a larger number of MIMO layers on another CC. This decision could be based on factors such as one CC having a much larger bandwidth or the UE experiencing good channel conditions. In such cases, it is advantageous for the UE to utilize that CC with its highest level of capability.

In these examples, the UE has been given the authority to redistribute its antenna resources, effectively enabling it to flexibly share them across different RATs, bands, and CCs.

Example aspects presented herein propose the solutions for granting a UE more authority in distributing its antenna resources (RF chains, also equivalent to the maximum number of MIMO layers) to optimize communication performance and resource utilization. These solutions offer different levels of flexibility. In the first configuration, the UE may decide the distribution of its antenna resources primarily on its own. In the second configuration, the UE and network may try to coordinate their decision. More details of these two configurations are provided below in the remainder of this patent application.

In the first configuration, the UE may autonomously decide the distribution of its antennas across multiple RATs, bands or band combinations, or CCs and inform the network accordingly. In the case of multi-RAT connectivity, the UE may report the parameters related to a given RAT to that RAT (e.g., the UE may report the distribution of resources for Macroscopic Channel Group (MCG) cells to MCG and the distribution of resources for Small Cell Channel Group (SCG) cells to SCG).

The indicated signaling from the UE could be in the form of deactivating some cells or changing the maximum number of MIMO layers. Under this configuration, two different network behaviors can be considered. In the first network behavior, the network may accept the UE selection as is and change its behavior or configuration accordingly. In the second network behavior, the network may decide not to operate according to the UE selection all the time. For example, assuming a UE has reported one layer on CC0 and three layers on CC1, the RAT associated with CC0 may decide to schedule a UL with two layers (not in accordance with UE reporting) in the hope that all antennas are not busy serving UL for the other RAT. In such a case, a UE may be able to assign more antennas to CC0. However, this behavior is not guaranteed. In other words, the network is accepting some level of risk (e.g., when the UE is not able to conform to the grant) and may consequently drop the grant. The choice of the two network behaviors may need to be aligned across network and a UE, and the choice between the two alternatives may be dependent on a UE capability and could be separately reported and selected for DL and UL.

Under the second network behavior, in the event of a scheduling conflict (i.e., the scheduling leads to concurrent operation beyond the UE's instructed signaling), a UE may act as a mediator and decide which operations to follow and which ones to ignore or partially follow. This decision-making process may be left up to the UE implementation or be based on predefined rules. For example, the prioritization could be performed for the RAT that decided to go beyond the UE's instructed capability or could be based on factors such as cell group index (MCG vs. SCG), bands, band duplex modes, type of channels, or priority of channels, services, or applications.

As used herein, "partially following a grant" means, for example, transmitting or receiving at a lower capability. For example, instead of transmitting a PUSCH with rank 2, the UE might transmit the PUSCH with a lower rank (e.g., rank 1). This step may utilize additional signaling from the UE to the network (e.g., gNB) to indicate that the grant was partially followed and which part of it was followed. Alternatively, the detection may be performed on the Rx side, such as the gNB, using DMRS detection to determine how many layers are transmitted by the transmitter.

When a UE acts as a mediator, it may need to signal to the network in case it decides to ignore some grants. This is mainly to ensure that the network can differentiate between poor link quality and prioritization by the UE, minimizing the impact on network's link adaptation procedures. In such cases, a UE should provide feedback on its decision to the network, which could be done by sending a special NACK to the network. A special NACK may be distinguishable by the network from a HARQ-ACK bit sent in response to a successful reception. For example, a specific resource (RB or cyclic shift) can be considered. Alternatively, the HARQ feedback can always be appended with an extra bit that indicates whether the grant was followed or not.

From the network perspective, some level of guarantee on what a UE can do may be desirable. Under the second network behavior, since the UE is the mediator, the network may not know whether its scheduling decision will be fully respected by the UE or not. To address this issue, a slot pattern can be defined.

The slot pattern may include two sets of slot types. The first slot type may include the set of slots where the UE conforms to the reported capability or instructed/updated capability and will not autonomously modify its decision. The second slot type may include the set of slots where the UE may perform prioritization based on the solutions presented previously. It is important to note that the time-domain format could be at different granularities as well, such as at the symbol level or group of symbols instead of slots.

The slot pattern may be decided in various ways. In some examples, the slot pattern may be decided by a UE and reported to the network (or RATs). In some examples, the UE may take each RAT's suitability into account when deciding the slot pattern. Alternatively, a UE may report its suitability of the slot pattern to the RAT(s), and the RAT(s) may come up with a pattern, which then may be signaled to the UE.

In the second configuration (i.e., the UE and network may try to coordinate their decision) the UE may make an initial decision (following the procedures of the first configuration), and then communicate with the RAT(s) (e.g., handshaking between the UE and the RAT(s)) to refine the procedure. For example, a UE may report its decision on the distribution of its antennas, and each RAT may send ACK or NACK, or suggest a different decision. In cases that involve multiple RATs, there could be signaling across multiple RATs to coordinate their decision before reporting back to the UE.

In some aspects, it is desirable to reduce the number of exchanges before the decision converges. For example, the procedure can be stopped by specifying the UE to modify its decision to take the RATs' suggestions into account (or at least one of them, e.g., MCG). Each RAT, or both together when coordinating, can come up with a set of decisions and leave it to the UE to pick one. The UE may be responsible for taking the suggestions from the RATs into account to the extent possible.

By incorporating a coordinated approach, the decision-making process can be more dynamic, allowing for better resource allocation and more efficient use of the available RF resources.

Besides the CA/DC mode of operation, the same proposals may apply when a UE is connected to different entities, such as a gNB on the UE-UTRAN (Uu) link and another device over the sidelink. This allows for a broader range of scenarios to benefit from the improved resource allocation and coordination between the UE and the network. Additionally, the solutions presented can extend beyond flexible antenna sharing to other sets of parameters, such as modulation order and supported bandwidth.

Figure 5:
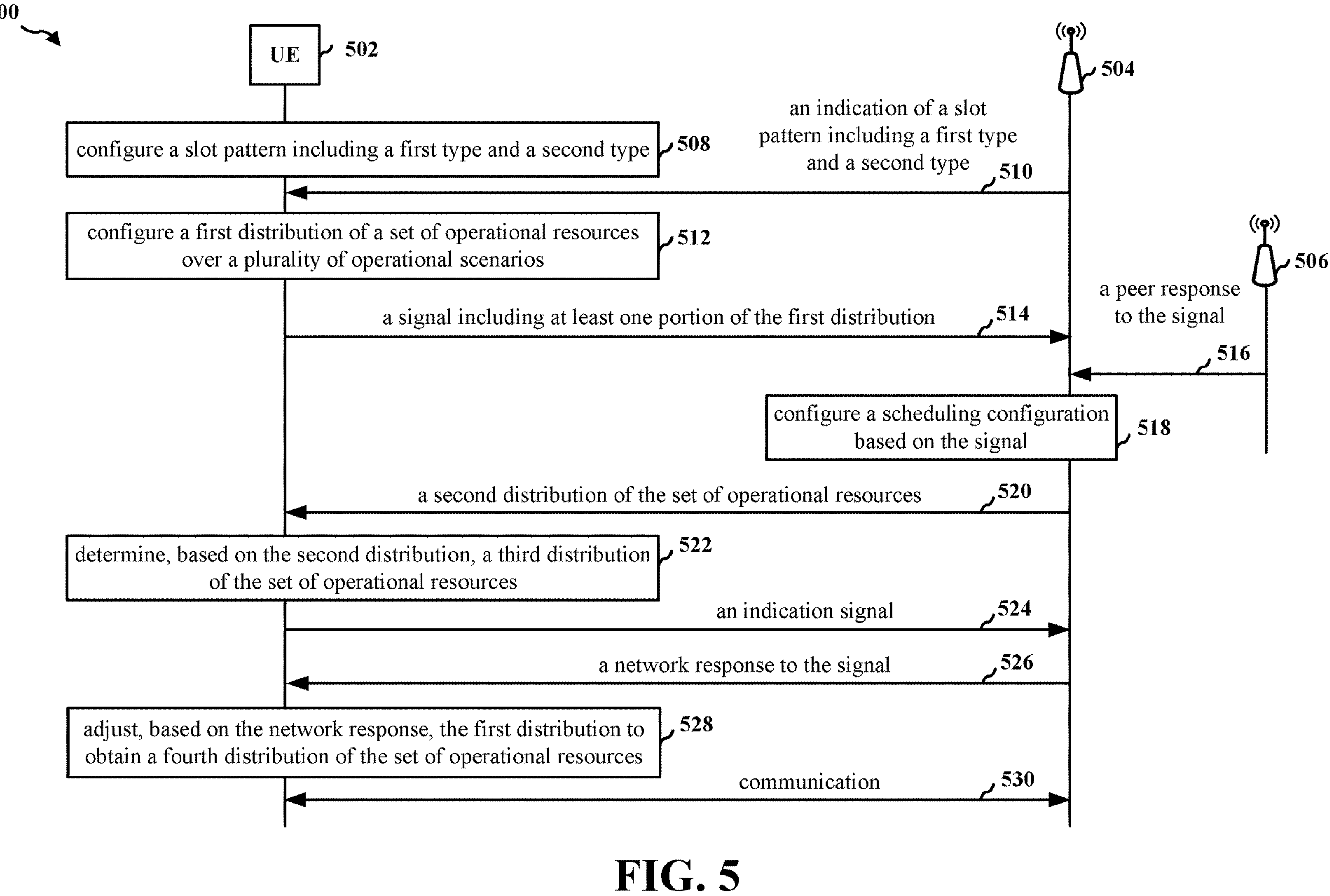
FIG. 5 is a call flow diagram illustrating a method of wireless communication in accordance with various aspects of the present disclosure.

FIG. 5 is a call flow diagram 500 illustrating a method of wireless communication in accordance with various aspects of this present disclosure. Example aspects are described in connection with a UE 502 and a base station 504. Various aspects may be performed by the UE 502 or the base station 504 in aggregation and/or by one or more components of a base station 504 (e.g., such as a CU 110, a DU 130, and/or an RU 140).

As shown in FIG. 5, in some aspects, at 508, a UE 502 may configure a slot pattern. The slot pattern may include a first type and a second type. In some aspects, at 510, the UE 502 may receive from the base station 504 an indication of a slot pattern including the first type and the second type. The UE 502 may configure the distribution of the radio capabilities differently depending on the type of slot the UE 502 is in. As used herein, the term "radio capabilities" may refer the specifications that determine a device's ability to communicate with another device over wireless communication.

At 512, the UE 502 may configure a first distribution of a set of radio capabilities over a plurality of operational scenarios. The plurality of operational scenarios may include, for example, a plurality of RATs associated with the UE 502, a plurality of frequency bands associated with the UE 502, a plurality of combinations of the plurality of frequency bands associated with the UE 502, a plurality of CCs associated with the UE 502, or an access link with the base station 504 and a sidelink with another UE. The set of radio capabilities may include, for example, one or more of: a set of antenna resources of the UE 502, a set of transmission capabilities of the UE 502, or a set of supported bandwidths of the UE 502. As used herein, an access link may be a link between a UE and a network device. The network device may be, for example, a gNB, an eNB, or another UE.

At 514, the UE 502 may transmit to the base station 504 a signal including at least one portion of the first distribution. For example, the plurality of operational scenarios may include the plurality of RATs. If the base station 504 is operating on a first RAT in the plurality of RATs, the signal may include the distribution of the set of radio capabilities on the first RAT.

At 516, the base station 504 may receive from a second base station 506 a peer response to the signal.

At 518, the base station 504 may configure a scheduling configuration based on the signal. In some aspects, the scheduling configuration may conform with the at least one portion of the first distribution of the set of radio capabilities (received at 514). In some aspects, the scheduling configuration may not conform with the at least one portion of the first distribution of the set of radio capabilities (received at 514). As used herein, the term "scheduling configuration" may refer to a configuration for resources allocation among different devices and/or channels in a wireless network.

At 520, the base station 504 may transmit to the UE 502 a second distribution of the set of radio capabilities.

At 522, the UE 502 may determine, based on the second distribution, a third distribution of the set of radio capabilities. The third distribution of the set of radio capabilities may be based on the second distribution. For example, the third distribution of the set of radio capabilities may include one or more of: a complete adaptation of a first portion of the second distribution of the set of radio capabilities (i.e., the third distribution includes all the first portion of the second distribution of the set of radio capabilities), an omission of a second portion of the second distribution of the set of radio capabilities (i.e., the third distribution does not include any of the second portion of the second distribution of the set of radio capabilities), or a partial adaptation of a third portion of the second distribution of the set of radio capabilities (e.g., the third distribution includes the third portion of the second distribution of the set of radio capabilities, but the third portion may be set at a lower capability (e.g., at a lower priority) compared to an original capability associated with the third portion of the second distribution).

At 524, the UE 502 may transmit to the base station 504 an indication signal. The indication signal may indicate one or more of: the complete adaptation of the first portion of the second distribution, the omission of the second portion of the second distribution, or the partial adaptation of the third portion of the second distribution.

At 526, the base station 504 may transmit to the UE 502 a network response to the signal (received at 514). The network response may include one or more of: an ACK to the signal, a NACK to the signal, or a network suitability for distributing the set of radio capabilities.

At 528, the UE 502 may adjust, based on the network response (received at 526), the first distribution to obtain a fourth distribution of the set of radio capabilities.

At 530, the UE 502 may communicate with the base station 504. The UE 502 may communicate with the base station 504 based on various configurations. The various configurations may be applied while the UE 502 is in an RRC-connected state. As used herein, the "RRC-connected state" refers to a state that the UE (e.g., the UE 502) has successfully completed the RRC connection setup procedure and has established a connection with the network (e.g., the base station 504). For example, the UE 502 may communicate with the base station 504 based on one or more of: the first distribution of the set of radio capabilities (at 512), the second distribution of the set of radio capabilities (at 520), the third distribution of the set of radio capabilities (at 522), the fourth distribution of the set of radio capabilities (at 528), or the scheduling configuration (at 518).

Figure 6:
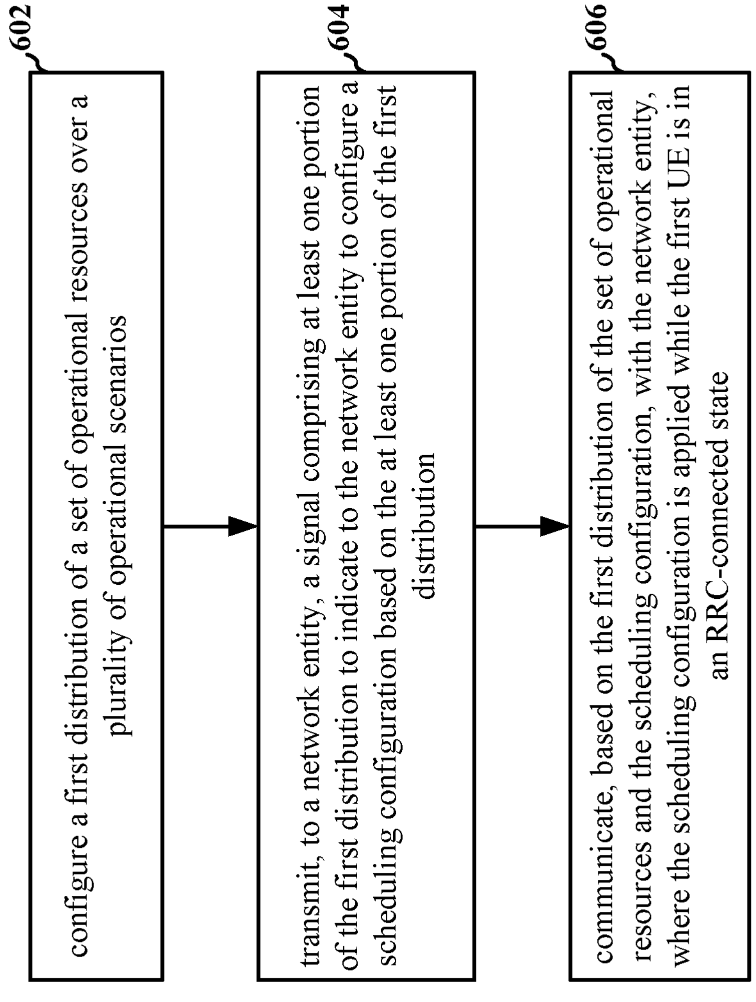
FIG. 6 is a flowchart illustrating methods of wireless communication at a UE in accordance with various aspects of the present disclosure.

FIG. 6 is a flowchart 600 illustrating methods of wireless communication at a first UE in accordance with various aspects of the present disclosure. The method may be performed by the first UE. The first UE may be the UE 104, 350, 502, or the apparatus 1004 in the hardware implementation of FIG. 10. The method enables a UE to actively participate in resource allocation decisions, resulting in enhanced communication performance and optimized resource utilization. By empowering the UE to flexibly redistribute antenna resources (e.g., RF chains or MIMO layers) across different RATs, bands, carriers, among other parameters, the method improves overall communication efficiency.

As shown in FIG. 6, at 602, the first UE may configure a first distribution of a set of radio capabilities over a plurality of operational scenarios. FIG. 5 illustrates various aspects of the steps in connection with flowchart 600. For example, referring to FIG. 5, the UE 502 may configure, at 512, a first distribution of a set of radio capabilities over a plurality of operational scenarios. In some aspects, 602 may be performed by the RF resource configuration component 198.

At 604, the first UE may transmit, to a network entity, a signal including at least one portion of the first distribution to indicate to the network entity to configure a scheduling configuration based on the at least one portion of the first distribution. The network entity may be a base station, or a component of a base station, in the access network of FIG. 1 or a core network component (e.g., base station 102, 310, 504; or the network entity 1002 in the hardware implementation of FIG. 10). For example, referring to FIG. 5, the UE 502 may transmit, at 514, to a network entity (the base station 504), a signal including at least one portion of the first distribution to indicate to the network entity (the base station 504) to configure, at 518, a scheduling configuration based on the at least one portion of the first distribution. In some aspects, 604 may be performed by the RF resource configuration component 198.

At 606, the first UE may communicate, based on the first distribution of the set of radio capabilities and the scheduling configuration, with the network entity. The scheduling configuration may be applied while the first UE is in an RRC-connected state. For example, referring to FIG. 5, the UE 502 may communicate, at 530, with the network entity (the base station 504). The communication may be based on the first distribution of the set of radio capabilities and the scheduling configuration. The scheduling configuration may be applied while the UE 502 is in an RRC-connected state. In some aspects, 606 may be performed by the RF resource configuration component 198.

Figure 7:
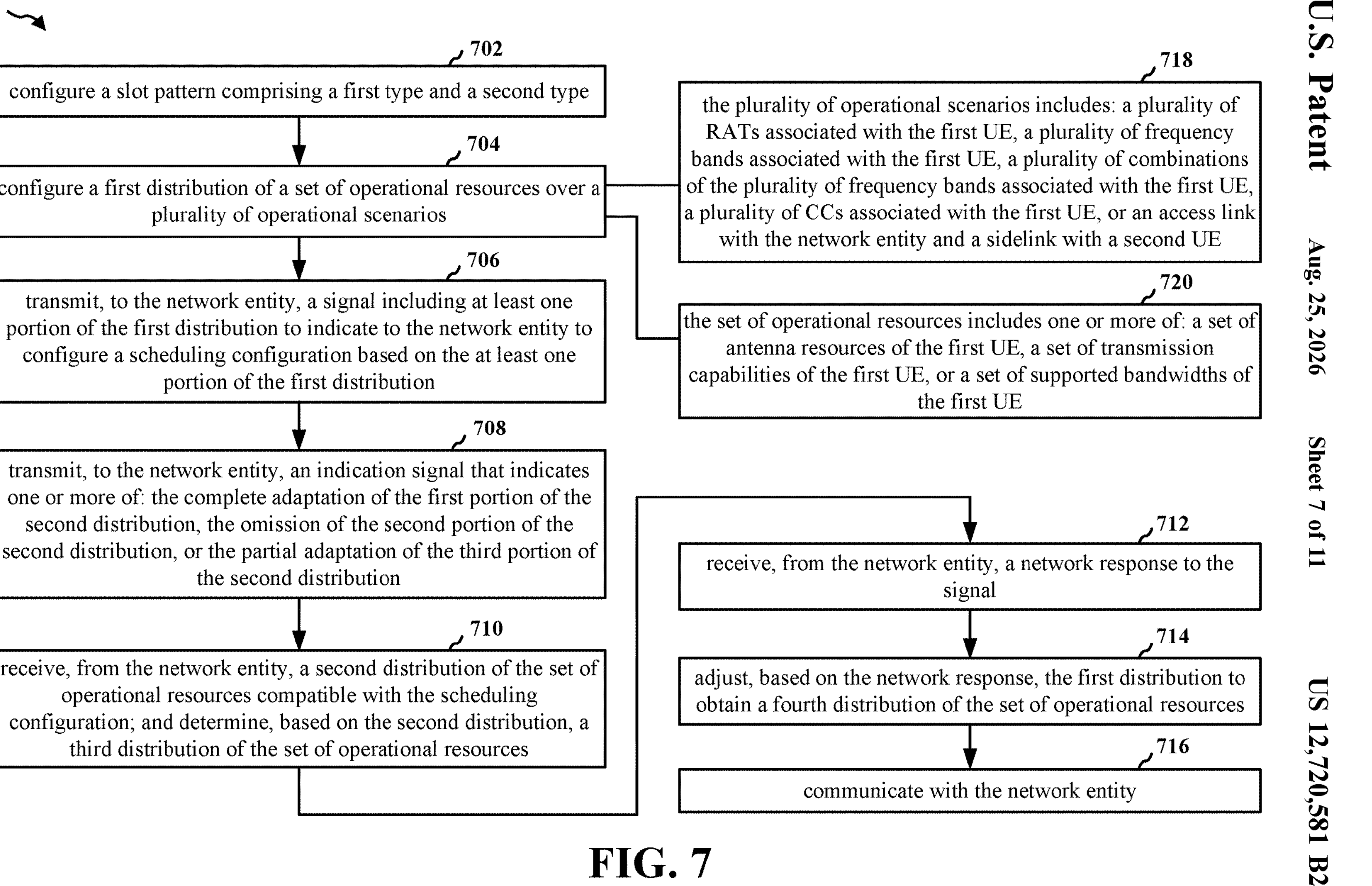
FIG. 7 is a flowchart illustrating methods of wireless communication at a UE in accordance with various aspects of the present disclosure.

FIG. 7 is a flowchart 700 illustrating methods of wireless communication at a first UE in accordance with various aspects of the present disclosure. The method may be performed by the first UE. The first UE may be the UE 104, 350, 502, or the apparatus 1004 in the hardware implementation of FIG. 10. The method enables a UE to actively participate in resource allocation decisions, resulting in enhanced communication performance and optimized resource utilization. By empowering the UE to flexibly redistribute antenna resources (e.g., RF chains or MIMO layers) across different RATs, bands, carriers, among other parameters, the method improves overall communication efficiency.

As shown in FIG. 7, at 704, the first UE may configure a first distribution of a set of radio capabilities over a plurality of operational scenarios. FIG. 5 illustrates various aspects of the steps in connection with flowchart 700. For example, referring to FIG. 5, the UE 502 may configure, at 512, a first distribution of a set of radio capabilities over a plurality of operational scenarios. In some aspects, 704 may be performed by the RF resource configuration component 198.

At 706, the first UE may transmit, to a network entity, a signal including at least one portion of the first distribution to indicate to the network entity to configure a scheduling configuration based on the at least one portion of the first distribution. The network entity may be a base station, or a component of a base station, in the access network of FIG. 1 or a core network component (e.g., base station 102, 310, 504; or the network entity 1002 in the hardware implementation of FIG. 10). For example, referring to FIG. 5, the UE 502 may transmit, at 514, to a network entity (the base station 504), a signal including at least one portion of the first distribution to indicate to the network entity (the base station 504) to configure, at 518, a scheduling configuration based on the at least one portion of the first distribution. In some aspects, 706 may be performed by the RF resource configuration component 198.

At 716, the first UE may communicate, based on the first distribution of the set of radio capabilities and the scheduling configuration, with the network entity. The scheduling configuration may be applied while the first UE is in an RRC-connected state. For example, referring to FIG. 5, the UE 502 may communicate, at 530, with the network entity (the base station 504). The communication may be based on the first distribution of the set of radio capabilities and the scheduling configuration. The scheduling configuration may be applied while the UE 502 is in an RRC-connected state. In some aspects, 716 may be performed by the RF resource configuration component 198.

In some aspects, at 718, the plurality of operational scenarios may include: a plurality of RATs associated with the first UE, a plurality of frequency bands associated with the first UE, a plurality of combinations of the plurality of frequency bands associated with the first UE, a plurality of CCs associated with the first UE, or an access link with the network entity and a sidelink with a second UE. For example, referring to FIG. 5, the plurality of operational scenarios may include: a plurality of RATs associated with the UE 502, a plurality of frequency bands associated with the UE 502, a plurality of combinations of the plurality of frequency bands associated with the UE 502, a plurality of CCs associated with the UE 502, or an access link with the network entity (the base station 504) and a sidelink with another UE.

In some aspects, at 720, the set of radio capabilities may include one or more of: a set of antenna resources of the first UE, a set of transmission capabilities of the first UE, or a set of supported bandwidths of the first UE. For example, referring to FIG. 5, the set of radio capabilities may include one or more of: a set of antenna resources of the UE 502, a set of transmission capabilities of the UE 502, or a set of supported bandwidths of the UE 502.

In some aspects, the set of transmission capabilities of the first UE may include one or more: the maximum number of MIMO layers, or the modulation order. For example, referring to FIG. 5, the set of transmission capabilities of the UE 502 (which was transmitted to the base station 504 at 514) may include one or more: the maximum number of MIMO layers, or the modulation order.

In some aspects, the plurality of operational scenarios may include the plurality of RATs, which may include a first RAT associated with the network entity, and the signal may include a distribution of the set of radio capabilities on the first RAT. For example, referring to FIG. 5, the plurality of operational scenarios may include the plurality of RATs including a first RAT associated with the network entity (the base station 504), and the signal (at 514) may include the distribution of the set of radio capabilities on the first RAT.

In some aspects, the signal includes one or more of: a deactivation of one or more cells associated with the first UE, or a change to the maximum number of the MIMO layers. For example, referring to FIG. 5, the signal (at 514) may include one or more of: a deactivation of one or more cells associated with the UE 502 or a change to the maximum number of the MIMO layers.

In some aspects, the scheduling configuration may be compatible with the first distribution of the set of radio capabilities, and, to communicate with the network entity, the first UE may be configured to: communicate, using the first distribution of the set of radio capabilities and the scheduling configuration, with the network entity. For example, referring to FIG. 5, the scheduling configuration (at 518) may be compatible with the first distribution of the set of radio capabilities (at 512), and, to communicate with the network entity (the base station 504), the UE 502 may be configured to communicate, at 530, using the first distribution of the set of radio capabilities (at 512) and the scheduling configuration (at 518), with the network entity (the base station 504).

In some aspects, the scheduling configuration may not be compatible with the first distribution of the set of radio capabilities, and, to communicate with the network entity, the first UE may be configured to, at 710, receive, from the network entity, a second distribution of the set of radio capabilities compatible with the scheduling configuration; and determine, based on the second distribution, a third distribution of the set of radio capabilities; and communicate, based on the third distribution of the set of radio capabilities and the scheduling configuration, with the network entity. For example, referring to FIG. 5, the scheduling configuration (at 518) may not be compatible with the first distribution of the set of radio capabilities (at 512). To communicate with the network entity (the base station 504) at 530, the UE 502 may be configured to receive, at 520, from the network entity (the base station 504), a second distribution of the set of radio capabilities compatible with the scheduling configuration; and determine, at 522, based on the second distribution, a third distribution of the set of radio capabilities. To communicate with the base station 504, the UE 502 may be configured to communicate, at 530, based on the third distribution of the set of radio capabilities (at 522) and the scheduling configuration (at 518), with the network entity (the base station 504). In some aspects, 710 may be performed by the RF resource configuration component 198.

In some aspects, the third distribution of the set of radio capabilities may include one or more of: a complete adaptation of a first portion of the second distribution of the set of radio capabilities, an omission of a second portion of the second distribution of the set of radio capabilities, or a partial adaptation of a third portion of the second distribution of the set of radio capabilities at a lower capability compared to an original capability associated with the third portion of the second distribution. For example, referring to FIG. 5, the third distribution of the set of radio capabilities (at 522) may include one or more of: a complete adaptation of a first portion of the second distribution of the set of radio capabilities (at 520), an omission of a second portion of the second distribution of the set of radio capabilities (at 520), or a partial adaptation of a third portion of the second distribution of the set of radio capabilities (at 520) at a lower capability compared to an original capability associated with the third portion of the second distribution.

In some aspects, at 708, the first UE may transmit, to the network entity, an indication signal that indicates one or more of: the complete adaptation of the first portion of the second distribution, the omission of the second portion of the second distribution, or the partial adaptation of the third portion of the second distribution. For example, referring to FIG. 5, the UE 502 may transmit, at 524, to the network entity (the base station 504), an indication signal. The indication signal may indicate one or more of: the complete adaptation of the first portion of the second distribution (at 520), the omission of the second portion of the second distribution (at 520), or the partial adaptation of the third portion of the second distribution (at 520). In some aspects, 708 may be performed by the RF resource configuration component 198.

In some aspects, the indication signal may include a special NACK signal. The special NACK signal may be implemented using an RB, a cyclic shift, or by one additional bit appended to HARQ feedback for the network entity. For example, referring to FIG. 5, the indication signal (at 524) may include a special NACK signal. The special NACK signal may be implemented using an RB, a cyclic shift, or by one additional bit appended to HARQ feedback for the network entity (the base station 504).

In some aspects, to determine the third distribution, the first UE may be configured to determine the third distribution based on a UE implementation or a preconfigured rule. For example, referring to FIG. 5, to determine the third distribution (at 522), the UE 502 may be configured to determine the third distribution based on a UE implementation or a preconfigured rule.

In some aspects, to determine the third distribution, the first UE may be configured to determine, in response to the scheduling configuration exceeding a UE capability, the third distribution based on a set of priorities for the set of radio capabilities. For example, referring to FIG. 5, to determine the third distribution (at 522), the UE 502 may be configured to determine, in response to the scheduling configuration (at 518) exceeding a UE capability, the third distribution based on a set of priorities for the set of radio capabilities.

In some aspects, the set of priorities for the set of radio capabilities may be based on one or more of: a cell group index, the plurality of frequency bands, band duplex modes, types of channels, first priorities of the channels, second priorities of services, or third priorities of applications. For example, referring to FIG. 5, the set of priorities for the set of radio capabilities (for determining the third distribution at 522) may be based on one or more of: a cell group index, the plurality of frequency bands, band duplex modes, types of channels, first priorities of the channels, second priorities of services, or third priorities of applications.

In some aspects, at 702, the first UE may configure a slot pattern. The slot pattern may include a first type and a second type. To configure the first distribution of the set of radio capabilities, the first UE may be configured to: configure, in response to the first UE being on a first slot of the first type, a preconfigured distribution of the set of radio capabilities, or configure, in response to the first UE being on a second slot of the second type, the first distribution of the set of radio capabilities. For example, referring to FIG. 5, the UE 502 may, at 508, configure a slot pattern. The slot pattern may include a first type and a second type. To configure the first distribution of the set of radio capabilities (at 512), the UE 502 may be configured to: configure, in response to the UE 502 being on a first slot of the first type, a preconfigured distribution of the set of radio capabilities, or configure, in response to the UE 502 being on a second slot of the second type, the first distribution of the set of radio capabilities. In some aspects, 702 may be performed by the RF resource configuration component 198.

In some aspects, to configure the slot pattern, the first UE may set the slot pattern, and report the slot pattern to the network entity; receive a slot pattern suitability from the network entity, and set the slot pattern based on the slot pattern suitability, or transmit a UE suitability to the network entity, and receive the slot pattern from the network entity, where the slot pattern is based on the UE suitability. As used herein, the "slot pattern suitability" may refer to a slot pattern the network entity can support, and the "UE suitability" may refer to a slot pattern that the UE can support. For example, referring to FIG. 5, to configure the slot pattern at 508, the UE 502 may set the slot pattern, and report the slot pattern to the network entity (the base station 504); receive a slot pattern suitability from the network entity (the base station 504), and set the slot pattern based on the slot pattern suitability, or transmit a UE suitability to the network entity (the base station 504), and receive the slot pattern, at 510, from the network entity (the base station), where the slot pattern may be based on the UE suitability.

In some aspects, the slot pattern may be based on a pattern type of one slot across the plurality of CCs associated with the first UE. For example, the slot pattern may dependent on whether one slot across the plurality of CCs associated with the first UE is for DL or UL. In one example, if, in a given slot, all CCs associated with the first UE are for DL, the first UE may configure the slot pattern to be the first slot pattern. On the other hand, if, in the given slot, there is one DL and all other are UL across the plurality of CCs associated with the first UE, the first UE may configure the slot pattern to be the second slot pattern different from the first slot pattern. Thus, the first UE may have different capabilities in DL and UL in these two cases.

In some aspects, at 712, the first UE may receive, from the network entity, a network response to the signal. The network response may include one or more of: an ACK to the signal, a NACK to the signal, or a network suitability for distributing the set of radio capabilities. As used herein, the "network suitability" for distributing the set of radio capabilities may refer to the network entity's indication/instruction for distributing the set of radio capabilities. For example, referring to FIG. 5, the UE 502 may receive, at 526, from the network entity (the base station 504), a network response to the signal. The network response may include one or more of: an ACK to the signal (transmitted at 514), a NACK to the signal (transmitted at 514), or a network suitability for distributing the set of radio capabilities. In some aspects, 712 may be performed by the RF resource configuration component 198.

In some aspects, at 714, the first UE may adjust, based on the network response, the first distribution to obtain a fourth distribution of the set of radio capabilities, and, to communicate with the network entity, the first UE may be configured to: communicate with the network entity based on the fourth distribution of the set of radio capabilities. For example, referring to FIG. 5, the UE 502 may adjust, at 528, based on the network response (at 526), the first distribution (at 512) to obtain a fourth distribution of the set of radio capabilities. To communicate with the network entity (the base station 504), the UE 502 may be configured to: communicate, at 530, with the network entity (the base station 504) based on the fourth distribution of the set of radio capabilities. In some aspects, 714 may be performed by the RF resource configuration component 198.

Figure 8:
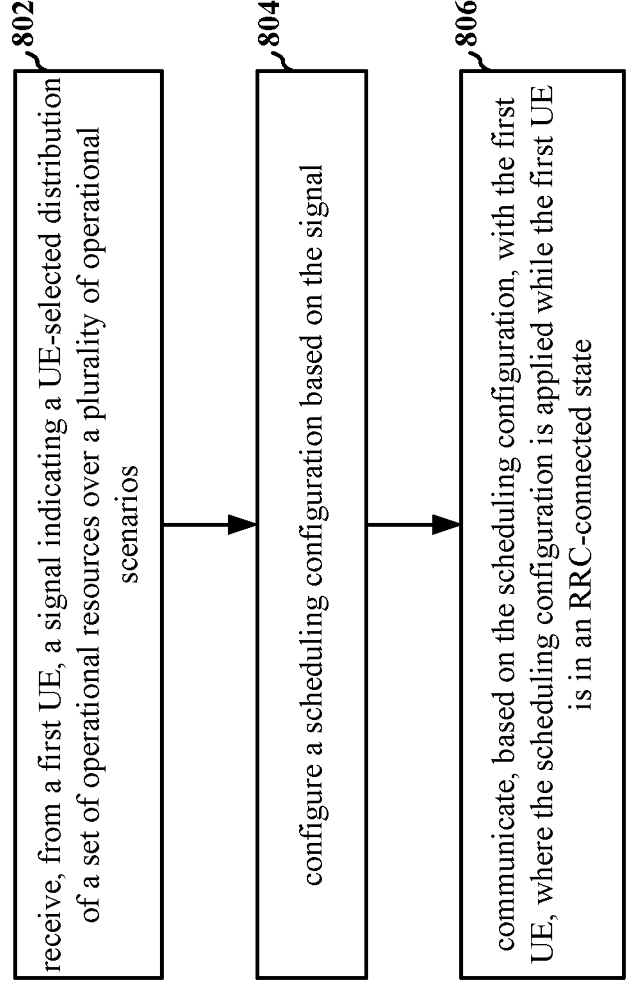
FIG. 8 is a flowchart illustrating methods of wireless communication at a network entity in accordance with various aspects of the present disclosure.

FIG. 8 is a flowchart 800 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 504; or the network entity 1002 in the hardware implementation of FIG. 10). The method enables a UE to actively participate in resource allocation decisions, resulting in enhanced communication performance and optimized resource utilization. By empowering the UE to flexibly redistribute antenna resources (e.g., RF chains or MIMO layers) across different RATs, bands, carriers, among other parameters, the method improves overall communication efficiency.

As shown in FIG. 8, at 802, the network entity may receive, from a first UE, a signal indicating a UE-selected distribution of a set of radio capabilities over a plurality of operational scenarios. The first UE may be the UE 104, 350, 502, or the apparatus 1004 in the hardware implementation of FIG. 10. FIG. 5 illustrates various aspects of the steps in connection with flowchart 800. For example, referring to FIG. 5, the network entity (the base station 504) may receive, at 514, from a first UE (the UE 502), a signal indicating a UE-selected distribution (the first distribution) of a set of radio capabilities over a plurality of operational scenarios. In some aspects, 802 may be performed by the RF resource configuration component 199.

At 804, the network entity may configure a scheduling configuration based on the signal. For example, referring to FIG. 5, the network entity (the base station 504) may configure, at 518, a scheduling configuration based on the signal (received at 514). In some aspects, 804 may be performed by the RF resource configuration component 199.

At 806, the network entity may communicate, based on the scheduling configuration, with the first UE. The scheduling configuration may be applied while the first UE is in an RRC-connected state. For example, referring to FIG. 5, the network entity (the base station 504) may communicate, at 530, based on the scheduling configuration (at 518), with the first UE (the UE 502). The scheduling configuration may be applied while the first UE (the UE 502) is in an RRC-connected state. In some aspects, 806 may be performed by the RF resource configuration component 199.

FIG. 9 is a flowchart 900 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 504; or the network entity 1002 in the hardware implementation of FIG. 10). The method enables a UE to actively participate in resource allocation decisions, resulting in enhanced communication performance and optimized resource utilization. By empowering the UE to flexibly redistribute antenna resources (e.g., RF chains or MIMO layers) across different RATs, bands, carriers, among other parameters, the method improves overall communication efficiency.

As shown in FIG. 9, at 904, the network entity may receive, from a first UE, a signal indicating a UE-selected distribution of a set of radio capabilities over a plurality of operational scenarios. The first UE may be the UE 104, 350, 502, or the apparatus 1004 in the hardware implementation of FIG. 10. FIG. 5 illustrates various aspects of the steps in connection with flowchart 900. For example, referring to FIG. 5, the network entity (the base station 504) may receive, at 514, from a first UE (the UE 502), a signal indicating a UE-selected distribution (the first distribution) of a set of radio capabilities over a plurality of operational scenarios. In some aspects, 904 may be performed by the RF resource configuration component 199.

At 910, the network entity may configure a scheduling configuration based on the signal. For example, referring to FIG. 5, the network entity (the base station 504) may configure, at 518, a scheduling configuration based on the signal (received at 514). In some aspects, 910 may be performed by the RF resource configuration component 199.

At 914, the network entity may communicate, based on the scheduling configuration, with the first UE. The scheduling configuration may be applied while the first UE is in an RRC-connected state. For example, referring to FIG. 5, the network entity (the base station 504) may communicate, at 530, based on the scheduling configuration (at 518), with the first UE (the UE 502). The scheduling configuration may be applied while the first UE (the UE 502) is in an RRC-connected state. In some aspects, 914 may be performed by the RF resource configuration component 199.

In some aspects, the plurality of operational scenarios may include: a plurality of RATs associated with the first UE, a plurality of frequency bands associated with the first UE, a plurality of combinations of the plurality of frequency bands associated with the first UE, a plurality of CCs associated with the first UE, or an access link with the network entity and a sidelink with a second UE. For example, referring to FIG. 5, the plurality of operational scenarios may include: a plurality of RATs associated with the UE 502, a plurality of frequency bands associated with the UE 502, a plurality of combinations of the plurality of frequency bands associated with the UE 502, a plurality of CCs associated with the UE 502, or an access link with the network entity (the base station 504) and a sidelink with another UE.

In some aspects, the set of radio capabilities may include one or more of: a set of antenna resources of the first UE, a set of transmission capabilities of the first UE, or a set of supported bandwidths of the first UE. For example, referring to FIG. 5, the set of radio capabilities may include one or more of: a set of antenna resources of the UE 502, a set of transmission capabilities of the UE 502, or a set of supported bandwidths of the UE 502.

In some aspects, the set of transmission capabilities of the first UE may include one or more: the maximum number of MIMO layers, or a modulation order. For example, referring to FIG. 5, the set of transmission capabilities of the UE 502 (which was received from the UE 502 at 514) may include one or more: the maximum number of MIMO layers, or the modulation order.

In some aspects, to configure the scheduling configuration, the network entity may be configured to: configure the scheduling configuration to conform with the UE-selected distribution of the set of radio capabilities. For example, referring to FIG. 5, to configure the scheduling configuration at 518, the network entity (the base station 504) may configure the scheduling configuration to conform with the UE-selected distribution (at least one portion of the first distribution, received at 514) of the set of radio capabilities.

In some aspects, to configure the scheduling configuration, the network entity may be configured to: configure the scheduling configuration to not conform with the UE-selected distribution of the set of radio capabilities, and, the scheduling configuration may include a second distribution of the set of radio capabilities, and, to communicate with the first UE, the network entity may be configured to: communicate, based on the second distribution of the set of radio capabilities, with the first UE. For example, referring to FIG. 5, to configure the scheduling configuration at 518, the network entity (the base station 504) may configure the scheduling configuration to not conform with the UE-selected distribution (at least one portion of the first distribution, received at 514) of the set of radio capabilities. The scheduling configuration (at 518) may include a second distribution of the set of radio capabilities, and, to communicate with the first UE (the UE 502), the network entity (the base station 504) may communicate, at 530, based on the second distribution of the set of radio capabilities, with the first UE (the UE 502).

In some aspects, at 906, the network entity may receive, from the first UE, an indication signal. The indication signal may indicate one or more of: a complete adaptation of a first portion of the second distribution, an omission of a second portion of the second distribution, or a partial adaptation of a third portion of the second distribution at a lower capability compared to an original capability associated with the third portion of the second distribution. For example, referring to FIG. 5, the network entity (the base station 504) may receive, at 524, from the first UE (the UE 502), an indication signal. The indication signal may indicate one or more of: a complete adaptation of a first portion of the second distribution, an omission of a second portion of the second distribution, or a partial adaptation of a third portion of the second distribution at a lower capability compared to an original capability associated with the third portion of the second distribution. In some aspects, 906 may be performed by the RF resource configuration component 199.

In some aspects, the indication signal may be a special NACK signal. The special NACK signal may be implemented using an RB, a cyclic shift, or by one additional bit appended to HARQ feedback for the network entity. For example, referring to FIG. 5, the indication signal (at 524) may include a special NACK signal. The special NACK signal may be implemented using an RB, a cyclic shift, or by one additional bit appended to HARQ feedback for the network entity (the base station 504).

In some aspects, at 902, the network entity may transmit, for the first UE, an indication of a slot pattern including a first type and a second type to indicate to the first UE to transmit the UE-selected distribution of the set of radio capabilities in response to the first UE being at a slot of the second type. For example, referring to FIG. 5, the network entity (the base station 504) may transmit, at 510, for the first UE (the UE 502), an indication of a slot pattern including a first type and a second type to indicate to the first UE (the UE 502) to transmit, at 514, the UE-selected distribution of the set of radio capabilities in response to the first UE being at a slot of the second type. In some aspects, 902 may be performed by the RF resource configuration component 199.

In some aspects, the slot pattern may be based on a pattern type of one slot across the plurality of CCs associated with the first UE. For example, the slot pattern may dependent on whether one slot across the plurality of CCs associated with the first UE is for DL or UL. In one example, if, in a given slot, all CCs associated with the first UE are for DL, the first UE may configure the slot pattern to be the first slot pattern. On the other hand, if, in the given slot, there is one DL and all other are UL across the plurality of CCs associated with the first UE, the first UE may configure the slot pattern to be the second slot pattern different from the first slot pattern. Thus, the first UE may have different capabilities in DL and UL in these two cases.

In some aspects, at 912, the network entity may transmit, for the first UE, a network response for the signal. The network response may include one or more of: an ACK to the signal, a NACK to the signal, or a network suitability for distributing the set of radio capabilities. For example, referring to FIG. 5, the network entity (the base station 504) may transmit, at 526, for the first UE (the UE 502), a network response for the signal (received at 514). The network response may include one or more of: an ACK to the signal (received at 514), a NACK to the signal (received at 514), or a network suitability for distributing the set of radio capabilities. In some aspects, 912 may be performed by the RF resource configuration component 199.

In some aspects, at 908, the network entity may receive, from a second network entity, a peer response to the signal, and the network response may be based on the peer response. For example, referring to FIG. 5, the network entity (the base station 504) may receive, at 516, from a second network entity (the second base station 506), a peer response to the signal. The network response (at 526) may be based on the peer response. In some aspects, 908 may be performed by the RF resource configuration component 199.

Figure 10:
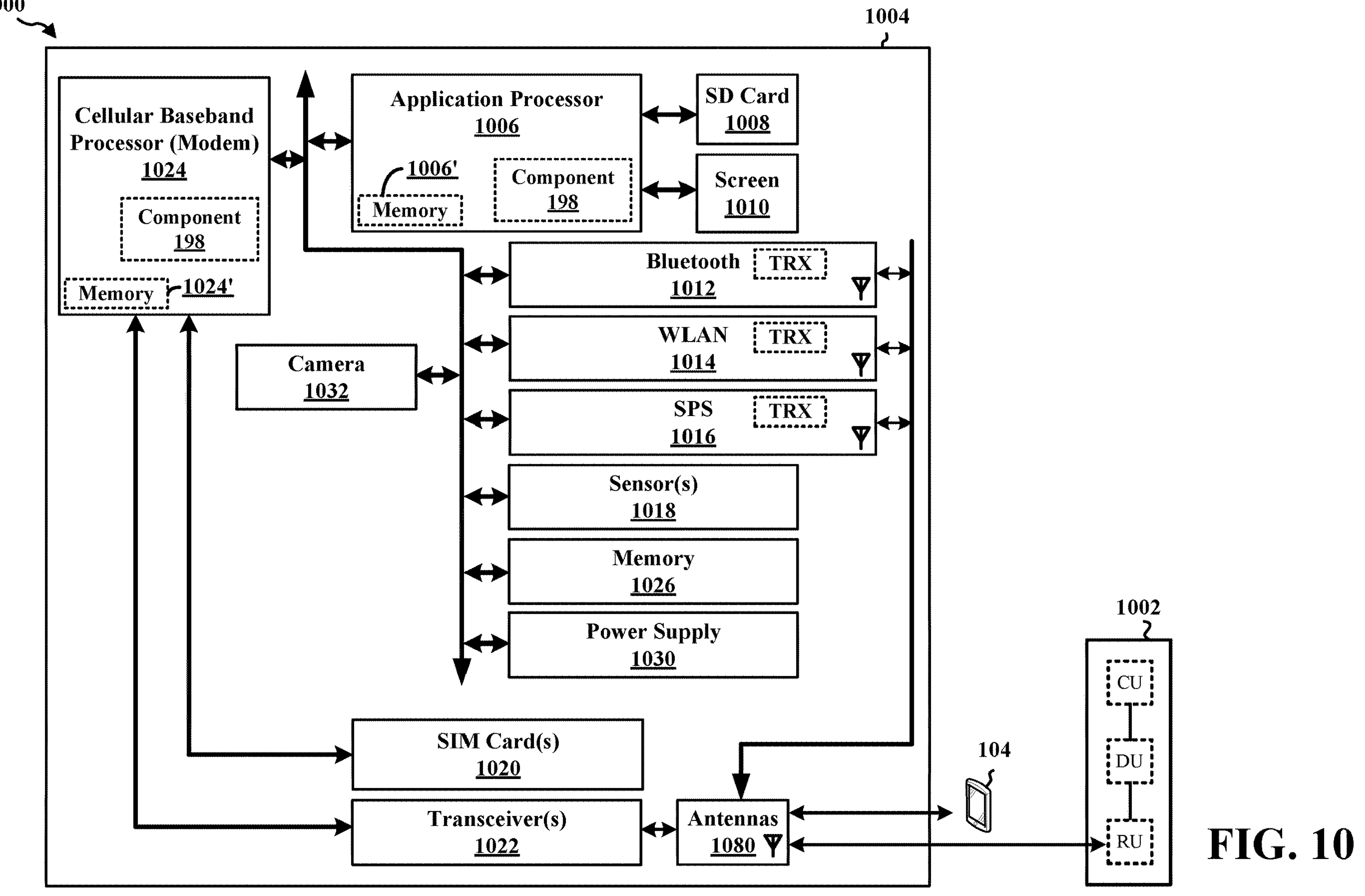
FIG. 10 is a diagram illustrating an example of a hardware implementation for an example apparatus and/or network entity.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include a cellular baseband processor 1024 (also referred to as a modem) coupled to one or more transceivers 1022 (e.g., cellular RF transceiver). The cellular baseband processor 1024 may include on-chip memory 1024'. In some aspects, the apparatus 1004 may further include one or more subscriber identity modules (SIM) cards 1020 and an application processor 1006 coupled to a secure digital (SD) card 1008 and a screen 1010. The application processor 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver (RX)). The Bluetooth module 1012, the WLAN module 1014, and the SPS module 1016 may include their own dedicated antennas and/or utilize the antennas 1080 for communication. The cellular baseband processor 1024 communicates through the transceiver(s) 1022 via one or more antennas 1080 with the UE 104 and/or with an RU associated with a network entity 1002. The cellular baseband processor 1024 and the application processor 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor 1024 and the application processor 1006 are each responsible for general processing, including the execution of software stored on the computer-readable medium/memory. The software, when executed by the cellular baseband processor 1024/application processor 1006, causes the cellular baseband processor 1024/application processor 1006 to perform the various functions described supra. The computer-readable medium/memory may also be used for storing data that is manipulated by the cellular baseband processor 1024/application processor 1006 when executing software. The cellular baseband processor 1024/application processor 1006 may be a component of the UE 350 and may include the memory 360 and/or at least one of the TX processor 368, the RX processor 356, and the controller/processor 359. In one configuration, the apparatus 1004 may be a processor chip (modem and/or application) and include just the cellular baseband processor 1024 and/or the application processor 1006, and in another configuration, the apparatus 1004 may be the entire UE (e.g., see UE 350 of FIG. 3) and include the additional modules of the apparatus 1004.

As discussed supra, the component 198 may be configured to configure a first distribution of a set of radio capabilities over a plurality of operational scenarios; transmit, to a network entity, a signal including at least one portion of the first distribution to indicate to the network entity to configure a scheduling configuration based on the at least one portion of the first distribution; and communicate, based on the first distribution of the set of radio capabilities and the scheduling configuration, with the network entity. The scheduling configuration may be applied while the UE communicating with the network entity is in an RRC-connected state. The component 198 may be further configured to perform any of the aspects described in connection with the flowcharts in FIG. 6 and FIG. 7, and/or performed by the UE 502 in FIG. 5. The component 198 may be within the cellular baseband processor 1024, the application processor 1006, or both the cellular baseband processor 1024 and the application processor 1006. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1004 may include a variety of components configured for various functions. In one configuration, the apparatus 1004, and in particular the cellular baseband processor 1024 and/or the application processor 1006, includes means for configuring a first distribution of a set of radio capabilities over a plurality of operational scenarios, means for transmitting, to a network entity, a signal including at least one portion of the first distribution to indicate to the network entity to configure a scheduling configuration based on the at least one portion of the first distribution, and means for communicating, based on the first distribution of the set of radio capabilities and the scheduling configuration, with the network entity. The scheduling configuration may be applied while the UE communicating with the network entity is in an RRC-connected state. The apparatus 1004 may further include means for performing any of the aspects described in connection with the flowcharts in FIG. 6 and FIG. 7, and/or aspects performed by the UE 502 in FIG. 5. The means may be the component 198 of the apparatus 1004 configured to perform the functions recited by the means. As described supra, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 11:
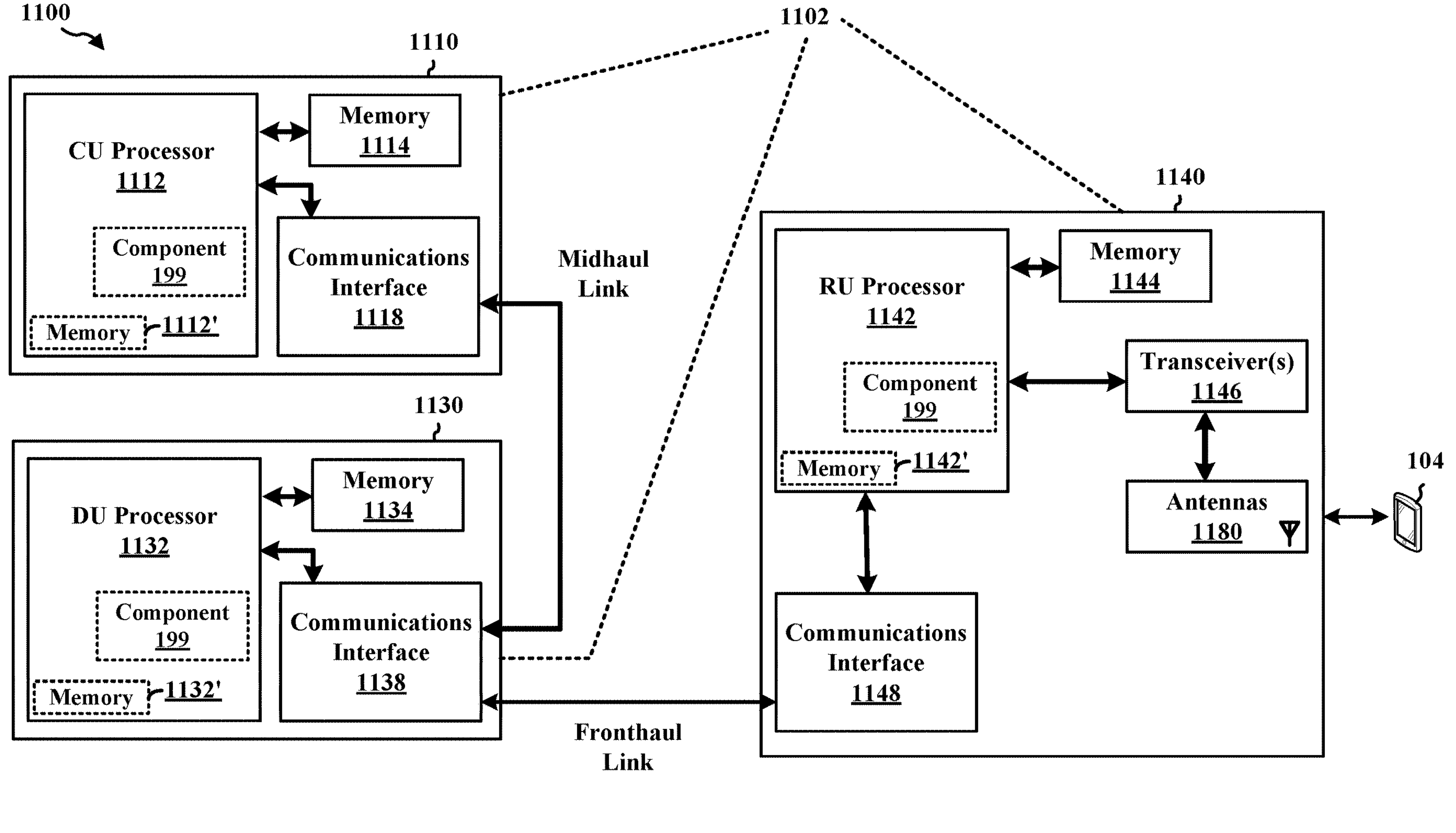
FIG. 11 is a diagram illustrating an example of a hardware implementation for an example network entity.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include a CU processor 1112. The CU processor 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include a DU processor 1132. The DU processor 1132 may include on-chip memory 1132'. In some aspects, the DU 1130 may further include additional memory modules 1134 and a communications interface 1138. The DU 1130 communicates with the RU 1140 through a fronthaul link. The RU 1140 may include an RU processor 1142. The RU processor 1142 may include on-chip memory 1142'. In some aspects, the RU 1140 may further include additional memory modules 1144, one or more transceivers 1146, antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive, from a first UE, a signal indicating a UE-selected distribution of a set of radio capabilities over a plurality of operational scenarios; configure a scheduling configuration based on the signal; and communicate, based on the scheduling configuration, with the first UE. The scheduling configuration may be applied while the first UE is in an RRC-connected state. The component 199 may be further configured to perform any of the aspects described in connection with the flowcharts in FIG. 8 and FIG. 9, and/or performed by the base station 504 in FIG. 5. The component 199 may be within one or more processors of one or more of the CU 1110, DU 1130, and the RU 1140. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 includes means for receiving, from a first UE, a signal indicating a UE-selected distribution of a set of radio capabilities over a plurality of operational scenarios, means for configuring a scheduling configuration based on the signal, and means for communicating, based on the scheduling configuration, with the first UE. The scheduling configuration may be applied while the first UE is in an RRC-connected state. The network entity 1102 may further include means for performing any of the aspects described in connection with the flowcharts in FIG. 8 and FIG. 9, and/or aspects performed by the base station 504 in FIG. 5. The means may be the component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include configuring a first distribution of a set of radio capabilities over a plurality of operational scenarios; transmitting, to a network entity, a signal including at least one portion of the first distribution to indicate to the network entity to configure a scheduling configuration based on the at least one portion of the first distribution; and communicating, based on the first distribution of the set of radio capabilities and the scheduling configuration, with the network entity. The scheduling configuration may be applied while the UE is in an RRC-connected state. The proposed method enables a UE to actively participate in resource allocation decisions, resulting in enhanced communication performance and optimized resource utilization. By empowering the UE to flexibly redistribute antenna resources (e.g., RF chains or MIMO layers) across different RATs, bands, carriers, among other parameters, the method improves overall communication efficiency.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean “one and only one” unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first user equipment (UE). The method may include configuring a first distribution of a set of radio capabilities over a plurality of operational scenarios; transmitting, to a network entity, a signal comprising at least one portion of the first distribution to indicate to the network entity to configure a scheduling configuration based on the at least one portion of the first distribution; and communicating, based on the first distribution of the set of radio capabilities and the scheduling configuration, with the network entity. The scheduling configuration may be applied while the first UE is in a radio resource control (RRC)-connected state.

Aspect 2 is the method of aspect 1, wherein the plurality of operational scenarios comprises: a plurality of radio access technologies (RATs) associated with the first UE, a plurality of frequency bands associated with the first UE, a plurality of combinations of the plurality of frequency bands associated with the first UE, a plurality of component carriers (CCs) associated with the first UE, or an access link with the network entity and a sidelink with a second UE.

Aspect 3 is the method of aspect 2, wherein the set of radio capabilities includes one or more of: a set of antenna resources of the first UE, a set of transmission capabilities of the first UE, or a set of supported bandwidths of the first UE.

Aspect 4 is the method of aspect 3, wherein the set of transmission capabilities of the first UE includes one or more: a maximum number of multiple-input multiple-output (MIMO) layers, or a modulation order.

Aspect 5 is the method of any of aspects 1 to 4, wherein the plurality of operational scenarios includes the plurality of RATs comprising a first RAT associated with the network entity, and wherein the signal comprises a distribution of the set of radio capabilities on the first RAT.

Aspect 6 is the method of any of aspects 1 to 4, wherein the signal includes one or more of: a deactivation of one or more cells associated with the first UE, or a change to the maximum number of the MIMO layers.

Aspect 7 is the method of any of aspects 1 to 4, wherein the scheduling configuration is compatible with the first distribution of the set of radio capabilities, and wherein communicating with the network entity comprises communicating, using the first distribution of the set of radio capabilities and the scheduling configuration, with the network entity.

Aspect 8 is the method of any of aspects 1 to 4, wherein the scheduling configuration is not compatible with the first distribution of the set of radio capabilities, and wherein communicating with the network entity comprises receiving, from the network entity, a second distribution of the set of radio capabilities compatible with the scheduling configuration; determining, based on the second distribution, a third distribution of the set of radio capabilities; and communicating, based on the third distribution of the set of radio capabilities and the scheduling configuration, with the network entity.

Aspect 9 is the method of aspect 8, wherein the third distribution of the set of radio capabilities includes one or more of: a complete adaptation of a first portion of the second distribution of the set of radio capabilities, an omission of a second portion of the second distribution of the set of radio capabilities, or a partial adaptation of a third portion of the second distribution of the set of radio capabilities at a lower capability compared to an original capability associated with the third portion of the second distribution.

Aspect 10 is the method of aspect 9, wherein the method may further comprise transmitting, to the network entity, an indication signal that indicates one or more of: the complete adaptation of the first portion of the second distribution, the omission of the second portion of the second distribution, or the partial adaptation of the third portion of the second distribution.

Aspect 11 is the method of aspect 10, wherein the indication signal comprises a special negative acknowledgement (NACK) signal, wherein the special NACK signal is implemented using a resource block (RB), a cyclic shift, or by one additional bit appended to hybrid automatic repeat request (HARQ) feedback for the network entity.

Aspect 12 is the method of aspect 8, wherein determining the third distribution comprises: determining the third distribution based on a UE implementation or a preconfigured rule.

Aspect 13 is the method of aspect 8, wherein determining the third distribution comprises: determining, in response to the scheduling configuration exceeding a UE capability, the third distribution based on a set of priorities for the set of radio capabilities.

Aspect 14 is the method of aspect 13, wherein the set of priorities for the set of radio capabilities is based on one or more of: a cell group index, the plurality of frequency bands, band duplex modes, types of channels, first priorities of the channels, second priorities of services, or third priorities of applications.

Aspect 15 is the method of any of aspects 1 to 3, wherein the method further comprises, prior to configuring the first distribution of the set of radio capabilities: configuring a slot pattern comprising a first type and a second type, and wherein, configuring the first distribution of the set of radio capabilities comprises: configuring, in response to the first UE being on a first slot of the first type, a preconfigured distribution of the set of radio capabilities, or configuring, in response to the first UE being on a second slot of the second type, the first distribution of the set of radio capabilities.

Aspect 16 is the method of aspect 15, wherein configuring the slot pattern comprises: (1) setting the slot pattern by the first UE, and reporting the slot pattern to the network entity; (2) receiving a slot pattern suitability from the network entity, and setting the slot pattern based on the slot pattern suitability, or (3) transmitting a UE suitability to the network entity, and receiving the slot pattern from the network entity, wherein the slot pattern is based on the UE suitability.

Aspect 17 is the method of aspect 15, wherein the slot pattern is based on a pattern type of one slot across the plurality of CCs associated with the first UE.

Aspect 18 is the method of any of aspects 1 to 3, wherein the method further comprises, prior to communicating with the network entity: receiving, from the network entity, a network response to the signal, wherein the network response comprises one or more of: an acknowledgement (ACK) to the signal, a negative ACK (NACK) to the signal, or a network suitability for distributing the set of radio capabilities; and adjusting, based on the network response, the first distribution to obtain a fourth distribution of the set of radio capabilities, and wherein communicating with the network entity comprises: communicating with the network entity based on the fourth distribution of the set of radio capabilities.

Aspect 19 is an apparatus for wireless communication at a UE, including: at least one memory; and at least one processor coupled to the at least one memory and, based at least in part on information stored in the at least one memory, the at least one processor, individually or in any combination, is configured to perform the method of any of aspects 1-18.

Aspect 20 is the apparatus of aspect 19, further including at least one of a transceiver or an antenna coupled to the at least one processor and configured to transmit the signal comprising the at least one portion of the first distribution.

Aspect 21 is an apparatus for wireless communication including means for implementing the method of any of aspects 1-18.

Aspect 22 is a computer-readable medium (e.g., a non-transitory computer-readable medium) storing computer-executable code, where the code when executed by a processor causes the processor to implement the method of any of aspects 1-18.

Aspect 23 is a method of wireless communication at a network entity. The method may include receiving, from a first user equipment (UE), a signal indicating a UE-selected distribution of a set of radio capabilities over a plurality of operational scenarios; configuring a scheduling configuration based on the signal; and communicating, based on the scheduling configuration, with the first UE. The scheduling configuration is applied while the first UE is in a radio resource control (RRC)-connected state.

Aspect 24 is the method of aspect 23, wherein the plurality of operational scenarios comprises: a plurality of radio access technologies (RATs) associated with the first UE, a plurality of frequency bands associated with the first UE, a plurality of combinations of the plurality of frequency bands associated with the first UE, a plurality of component carriers (CCs) associated with the first UE, or an access link with the network entity and a sidelink with a second UE.

Aspect 25 is the method of aspect 24, wherein the set of radio capabilities include one or more of: a set of antenna resources of the first UE, a set of transmission capabilities of the first UE, or a set of supported bandwidths of the first UE. The set of transmission capabilities of the first UE include one or more: a maximum number of multiple-input multiple-output (MIMO) layers, or a modulation order.

Aspect 26 is the method of any of aspects 23 to 25, wherein configuring the scheduling configuration comprises: configuring the scheduling configuration to conform with the UE-selected distribution of the set of radio capabilities.

Aspect 27 is the method of any of aspects 23 to 25, wherein configuring the scheduling configuration comprises: configuring the scheduling configuration to not conform with the UE-selected distribution of the set of radio capabilities, and wherein the scheduling configuration comprises a second distribution of the set of radio capabilities, and wherein, communicating with the network entity comprises: communicating, based on the second distribution of the set of radio capabilities, with the first UE.

Aspect 28 is the method of aspect 27, wherein the method further comprises: receiving, from the first UE, an indication signal that indicates one or more of: a complete adaptation of a first portion of the second distribution, an omission of a second portion of the second distribution, or a partial adaptation of a third portion of the second distribution at a lower capability compared to an original capability associated with the third portion of the second distribution.

Aspect 29 is the method of aspect 28, wherein the indication signal is a special negative acknowledgement (NACK) signal, wherein the special NACK signal is implemented using a resource block (RB), a cyclic shift, or by one additional bit appended to hybrid automatic repeat request (HARQ) feedback for the network entity.

Aspect 30 is the method of any of aspects 23 to 29, wherein the method further comprises, prior to being configured to receive the signal: transmitting, for the first UE, an indication of a slot pattern comprising a first type and a second type to indicate to the first UE to transmit the UE-selected distribution of the set of radio capabilities in response to the first UE being at a slot of the second type.

Aspect 31 is the method of any of aspects 23 to 30, wherein the method further comprises, prior to communicating with the first UE: transmitting, for the first UE, a network response for the signal, wherein the network response comprises one or more of: an acknowledgement (ACK) to the signal, a negative ACK (NACK) to the signal, or a network suitability for distributing the set of radio capabilities.

Aspect 32 is the method of aspect 31, wherein the network entity is a first network entity, and wherein the method further comprises: receiving, from a second network entity, a peer response to the signal, and wherein the network response is based on the peer response.

Aspect 33 is an apparatus for wireless communication at a network entity, including: at least one memory; and at least one processor coupled to the at least one memory and, based at least in part on information stored in the at least one memory, the at least one processor, individually or in any combination, is configured to perform the method of any of aspects 23-32.

Aspect 34 is the apparatus of aspect 33, further including at least one of a transceiver or an antenna coupled to the at least one processor and configured to receive the signal indicating the UE-selected distribution of the set of radio capabilities.

Aspect 35 is an apparatus for wireless communication including means for implementing the method of any of aspects 23-32.

Aspect 36 is a computer-readable medium (e.g., a non-transitory computer-readable medium) storing computer-executable code, where the code when executed by a processor causes the processor to implement the method of any of aspects 23-32.

What is claimed is:

1. An apparatus for wireless communication at a first user equipment (UE), comprising:

at least one memory; and at least one processor coupled to the at least one memory and, based at least in part on information stored in the at least one memory, the at least one processor is configured to:

configure a first distribution of a set of radio capabilities over a plurality of operational scenarios, wherein the set of radio capabilities includes a set of antenna resources of the first UE, and wherein the first distribution of the set of radio capabilities includes a distribution of the set of antenna resources over the plurality of operational scenarios;

transmit, to a network entity, a signal comprising at least one portion of the first distribution to indicate to the network entity to configure a scheduling configuration based on the at least one portion of the first distribution; and communicate, based on the first distribution of the set of radio capabilities and the scheduling configuration, with the network entity, wherein the scheduling configuration is applied while the first UE is in a radio resource control (RRC)-connected state, wherein the scheduling configuration is not compatible with the first distribution of the set of radio capabilities, and wherein to communicate with the network entity, the at least one processor is configured to:

receive, from the network entity, a second distribution of the set of radio capabilities compatible with the scheduling configuration;

determine, based on the second distribution, a third distribution of the set of radio capabilities; and communicate, based on the third distribution of the set of radio capabilities and the scheduling configuration, with the network entity.

2. The apparatus of claim 1, further comprising a transceiver coupled to the at least one processor, wherein, to transmit the signal comprising the at least one portion of the first distribution, the at least one processor is configured to transmit the signal comprising the at least one portion of the first distribution via the transceiver, and wherein the plurality of operational scenarios comprises:

a plurality of radio access technologies (RATs) associated with the first UE, a plurality of frequency bands associated with the first UE, a plurality of combinations of the plurality of frequency bands associated with the first UE, a plurality of component carriers (CCs) associated with the first UE, or an access link with the network entity and a sidelink with a second UE.

3. The apparatus of claim 2, wherein the set of radio capabilities further includes one or more of:

a set of transmission capabilities of the first UE, or a set of supported bandwidths of the first UE.

4. The apparatus of claim 3, wherein the set of transmission capabilities of the first UE includes one or more:

a maximum number of multiple-input multiple-output (MIMO) layers, or a modulation order.

5. The apparatus of claim 4, wherein the plurality of operational scenarios includes the plurality of RATs comprising a first RAT associated with the network entity, and wherein the signal comprises:

a distribution of the set of radio capabilities on the first RAT.

6. The apparatus of claim 4, wherein the signal includes one or more of:

a deactivation of one or more cells associated with the first UE, or a change to the maximum number of the MIMO layers.

7. The apparatus of claim 3, wherein the at least one processor is further configured to, prior to the configuration of the first distribution of the set of radio capabilities:

configure a slot pattern comprising a first type and a second type, and wherein, to configure the first distribution of the set of radio capabilities, the at least one processor is configured to:

configure, in response to the first UE being on a first slot of the first type, a preconfigured distribution of the set of radio capabilities, or configure, in response to the first UE being on a second slot of the second type, the first distribution of the set of radio capabilities.

8. The apparatus of claim 7, wherein, to configure the slot pattern, the at least one processor is configured to:

set the slot pattern, and report the slot pattern to the network entity;

receive a slot pattern suitability from the network entity, and set the slot pattern based on the slot pattern suitability, or transmit a UE suitability to the network entity, and receive the slot pattern from the network entity, wherein the slot pattern is based on the UE suitability.

9. The apparatus of claim 7, wherein the slot pattern is based on a pattern type of one slot across the plurality of CCs associated with the first UE.

10. The apparatus of claim 1, wherein the third distribution of the set of radio capabilities includes one or more of:

a complete adaptation of a first portion of the second distribution of the set of radio capabilities, an omission of a second portion of the second distribution of the set of radio capabilities, or a partial adaptation of a third portion of the second distribution of the set of radio capabilities at a lower capability compared to an original capability associated with the third portion of the second distribution.

11. The apparatus of claim 10, wherein the at least one processor is further configured to:

transmit, to the network entity, an indication signal that indicates one or more of:

the complete adaptation of the first portion of the second distribution, the omission of the second portion of the second distribution, or the partial adaptation of the third portion of the second distribution.

12. The apparatus of claim 11, wherein the indication signal comprises a special negative acknowledgement (NACK) signal, wherein the special NACK signal is implemented using a resource block (RB), a cyclic shift, or by one additional bit appended to hybrid automatic repeat request (HARQ) feedback for the network entity.

13. The apparatus of claim 1, wherein, to determine the third distribution, the at least one processor is configured to:

determine the third distribution based on a UE implementation or a preconfigured rule.

14. The apparatus of claim 1, wherein, to determine the third distribution, the at least one processor is configured to:

determine, in response to the scheduling configuration exceeding a UE capability, the third distribution based on a set of priorities for the set of radio capabilities.

15. The apparatus of claim 14, wherein the set of priorities for the set of radio capabilities is based on one or more of:

a cell group index, a plurality of frequency bands, band duplex modes, types of channels, first priorities of the channels, second priorities of services, or third priorities of applications.

16. An apparatus for wireless communication at a first user equipment (UE), comprising:

at least one memory; and at least one processor coupled to the at least one memory and, based at least in part on information stored in the at least one memory, the at least one processor is configured to:

configure a first distribution of a set of radio capabilities over a plurality of operational scenarios, wherein the set of radio capabilities includes a set of antenna resources of the first UE, and wherein the first distribution of the set of radio capabilities includes a distribution of the set of antenna resources over the plurality of operational scenarios;

transmit, to a network entity, a signal comprising at least one portion of the first distribution to indicate to the network entity to configure a scheduling configuration based on the at least one portion of the first distribution;

receive, from the network entity, a network response to the signal, wherein the network response comprises one or more of:

an acknowledgement (ACK) to the signal, a negative ACK (NACK) to the signal, or a network suitability for distributing the set of radio capabilities;

adjust, based on the network response, the first distribution to obtain a fourth distribution of the set of radio capabilities; and communicate with the network entity based on the fourth distribution of the set of radio capabilities.

17. The apparatus of claim 16, wherein the plurality of operational scenarios comprises:

a plurality of radio access technologies (RATs) associated with the first UE, a plurality of frequency bands associated with the first UE, a plurality of combinations of the plurality of frequency bands associated with the first UE, a plurality of component carriers (CCs) associated with the first UE, or an access link with the network entity and a sidelink with a second UE.

18. The apparatus of claim 17, wherein the set of radio capabilities further includes one or more of:

a set of transmission capabilities of the first UE, or a set of supported bandwidths of the first UE.

19. The apparatus of claim 18, wherein the set of transmission capabilities of the first UE includes one or more:

a maximum number of multiple-input multiple-output (MIMO) layers, or a modulation order.

20. The apparatus of claim 19, wherein the plurality of operational scenarios includes the plurality of RATs comprising a first RAT associated with the network entity, and wherein the signal comprises:

a distribution of the set of radio capabilities on the first RAT.

21. The apparatus of claim 19, wherein the signal includes one or more of:

a deactivation of one or more cells associated with the first UE, or a change to the maximum number of the MIMO layers.

22. An apparatus of wireless communication at a network entity, comprising:

at least one memory; and at least one processor coupled to the at least one memory and, based at least in part on information stored in the at least one memory, the at least one processor is configured to:

receive, from a first user equipment (UE), a signal indicating a UE-selected distribution of a set of radio capabilities over a plurality of operational scenarios, wherein the set of radio capabilities includes a set of antenna resources of the first UE, and wherein the UE-selected distribution of the set of radio capabilities includes a distribution of the set of antenna resources over the plurality of operational scenarios;

configure a scheduling configuration based on the signal; and communicate, based on the scheduling configuration, with the first UE, wherein the scheduling configuration is applied while the first UE is in a radio resource control (RRC)-connected state, wherein to configure the scheduling configuration, the at least one processor is configured to:

configure the scheduling configuration to not conform with the UE-selected distribution of the set of radio capabilities, and wherein the scheduling configuration comprises a second distribution of the set of radio capabilities, and wherein to communicate with the first UE, the at least one processor is configured to:

communicate, based on the second distribution of the set of radio capabilities, with the first UE.

23. The apparatus of claim 22, further comprising a transceiver coupled to the at least one processor, wherein, to receive the signal indicating the UE-selected distribution of the set of radio capabilities, the at least one processor is configured to receive the signal via the transceiver, and wherein the plurality of operational scenarios comprises:

a plurality of radio access technologies (RATs) associated with the first UE, a plurality of frequency bands associated with the first UE, a plurality of combinations of the plurality of frequency bands associated with the first UE, a plurality of component carriers (CCs) associated with the first UE, or an access link with the network entity and a sidelink with a second UE.

24. The apparatus of claim 23, wherein the set of radio capabilities further include one or more of:

a set of transmission capabilities of the first UE, or a set of supported bandwidths of the first UE, and wherein the set of transmission capabilities of the first UE include one or more:

a maximum number of multiple-input multiple-output (MIMO) layers, or a modulation order.

25. The apparatus of claim 23, wherein the at least one processor is further configured to:

receive, from the first UE, an indication signal that indicates one or more of:

a complete adaptation of a first portion of the second distribution, an omission of a second portion of the second distribution, or a partial adaptation of a third portion of the second distribution at a lower capability compared to an original capability associated with the third portion of the second distribution.

26. The apparatus of claim 25, wherein the indication signal is a special negative acknowledgement (NACK) signal, wherein the special NACK signal is implemented using a resource block (RB), a cyclic shift, or by one additional bit appended to hybrid automatic repeat request (HARQ) feedback for the network entity.

27. The apparatus of claim 22, wherein the at least one processor is further configured to, prior to a reception of the signal:

transmit, for the first UE, an indication of a slot pattern comprising a first type and a second type to indicate to the first UE to transmit the UE-selected distribution of the set of radio capabilities in response to the first UE being at a slot of the second type.

28. The apparatus of claim 22, wherein the at least one processor is further configured to, prior to the communication with the first UE:

transmit, for the first UE, a network response for the signal, wherein the network response comprises one or more of:

an acknowledgement (ACK) to the signal, a negative ACK (NACK) to the signal, or a network suitability for distributing the set of radio capabilities.

29. The apparatus of claim 28, wherein the network entity is a first network entity, and wherein the at least one processor is further configured to:

receive, from a second network entity, a peer response to the signal, and wherein the network response is based on the peer response.

30. A method of wireless communication at a first user equipment (UE), comprising:

configuring a first distribution of a set of radio capabilities over a plurality of operational scenarios, wherein the set of radio capabilities includes a set of antenna resources of the first UE, and wherein the first distribution of the set of radio capabilities includes a distribution of the set of antenna resources over the plurality of operational scenarios;

transmitting, to a network entity, a signal comprising at least one portion of the first distribution to indicate to the network entity to configure a scheduling configuration based on the at least one portion of the first distribution; and communicating, based on the first distribution of the set of radio capabilities and the scheduling configuration, with the network entity, wherein the scheduling configuration is applied while the UE is in a radio resource control (RRC)-connected state, wherein the scheduling configuration is not compatible with the first distribution of the set of radio capabilities, and wherein communicating with the network entity comprises:

receiving, from the network entity, a second distribution of the set of radio capabilities compatible with the scheduling configuration;

determining, based on the second distribution, a third distribution of the set of radio capabilities; and communicating, based on the third distribution of the set of radio capabilities and the scheduling configuration, with the network entity.

* * * * *